(12) United States Patent
Ding et al.

(10) Patent No.: US 12,031,022 B2
(45) Date of Patent: *Jul. 9, 2024

(54) DUAL CATALYST SYSTEM FOR PRODUCING LLDPE AND MDPE COPOLYMERS WITH LONG CHAIN BRANCHING FOR FILM APPLICATIONS

(71) Applicant: Chevron Phillips Chemical Company LP, The Woodlands, TX (US)

(72) Inventors: Errun Ding, Mason, OH (US); Chung Ching Tso, Bartlesville, OK (US); Max P. McDaniel, Bartlesville, OK (US); Ashish M. Sukhadia, Bartlesville, OK (US); Youlu Yu, Bartlesville, OK (US); Randall S. Muninger, Dewey, OK (US); Aaron M. Osborn, Owasso, OK (US); Christopher E. Wittner, Dewey, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 16 days.

This patent is subject to a terminal disclaimer.

(21) Appl. No.: 17/732,628

(22) Filed: Apr. 29, 2022

(65) Prior Publication Data

US 2022/0267579 A1 Aug. 25, 2022

Related U.S. Application Data

(63) Continuation of application No. 16/837,009, filed on Apr. 1, 2020, now Pat. No. 11,339,279.

(51) Int. Cl.
| | | |
|---|---|---|
| C08F 210/16 | (2006.01) | |
| C08F 4/6592 | (2006.01) | |
| C08L 23/08 | (2006.01) | |

(52) U.S. Cl.
CPC ...... *C08L 23/0815* (2013.01); *C08F 4/65925* (2013.01); *C08F 4/65927* (2013.01); *C08F 210/16* (2013.01); *C08L 2203/16* (2013.01); *C08L 2207/066* (2013.01)

(58) Field of Classification Search
CPC ............................ C08F 210/16; C08F 210/14
See application file for complete search history.

(56) References Cited

U.S. PATENT DOCUMENTS

| | | |
|---|---|---|
| 2,794,599 A | 6/1957 | Irwin |
| 3,242,099 A | 3/1966 | Manyik |
| 3,248,179 A | 4/1966 | Norwood |
| 4,501,885 A | 2/1985 | Sherk |
| 4,588,790 A | 5/1986 | Jenkins, III |
| 4,794,096 A | 12/1988 | Ewen |
| 4,808,561 A | 2/1989 | Welborn, Jr. |
| 5,165,929 A | 11/1992 | Howell |
| 5,352,749 A | 10/1994 | Dechellis |
| 5,391,816 A | 2/1995 | Tomko |
| 5,436,304 A | 7/1995 | Griffin |
| 5,565,175 A | 10/1996 | Hottovy |
| 5,575,979 A | 11/1996 | Hanson |
| 5,576,259 A | 11/1996 | Hasegawa |
| 5,807,938 A | 9/1998 | Kaneko |
| 5,919,983 A | 7/1999 | Rosen |
| 6,107,230 A | 8/2000 | McDaniel |
| 6,136,936 A | 10/2000 | Dall'Occo |
| 6,165,929 A | 12/2000 | McDaniel |
| 6,239,235 B1 | 5/2001 | Hottovy |
| 6,262,191 B1 | 7/2001 | Hottovy |
| 6,294,494 B1 | 9/2001 | McDaniel |
| 6,300,271 B1 | 10/2001 | McDaniel |
| 6,316,553 B1 | 11/2001 | McDaniel |
| 6,355,594 B1 | 3/2002 | McDaniel |

(Continued)

FOREIGN PATENT DOCUMENTS

| | | |
|---|---|---|
| CN | 105745234 A | 7/2016 |
| CN | 105849138 A | 8/2016 |

(Continued)

OTHER PUBLICATIONS

Related U.S. Appl. No. 17/142,312, filed Jan. 6, 2021.
International Search Report and Written Opinion issued in corresponding application No. PCT/US2021/023859, dated Jul. 12, 2021, 11 pages.
Related U.S. Appl. No. 17/571,665, filed Jan. 10, 2022.
Related U.S. Appl. No. 17/552,451, filed Dec. 16, 2021.
Andy H. Tsou, et al., "Processability-Enhanced Bimodal High-Density Polyethylene With Comb-Branched High-Density Polyethylene," Journal of Applied Polymer Science, 2018, , DOI: 10.1002/APP.45755, 7 pages.

(Continued)

*Primary Examiner* — Rip A Lee
(74) *Attorney, Agent, or Firm* — Merchant & Gould P.C.

(57) ABSTRACT

Disclosed herein are ethylene-based polymers generally characterized by a melt index of less than 15 g/10 min, a density from 0.91 to 0.945 g/cm³, a CY-a parameter at 190° C. from 0.2 to 0.6, an average number of long chain branches per 1,000,000 total carbon atoms of the polymer in a molecular weight range of 500,000 to 2,000,000 g/mol of less than 5, and a maximum ratio of $\eta_E/3\eta$ at an extensional rate of 0.03 sec$^{-1}$ in a range from 3 to 15. The ethylene polymers have substantially no long chain branching in the high molecular weight fraction of the polymer, but instead have significant long chain branching in the lower molecular weight fraction, such that polymer melt strength and bubble stability are maintained for the fabrication of blown films and other articles of manufacture. These ethylene polymers can be produced using a dual catalyst system containing a single atom bridged metallocene compound with an indenyl group and a cyclopentadienyl group, and an unbridged hafnium metallocene compound with two cyclopentadienyl groups.

25 Claims, 9 Drawing Sheets

(56) References Cited

U.S. PATENT DOCUMENTS

| | | |
|---|---|---|
| 6,376,415 B1 | 4/2002 | McDaniel |
| 6,388,017 B1 | 5/2002 | McDaniel |
| 6,391,816 B1 | 5/2002 | McDaniel |
| 6,395,666 B1 | 5/2002 | McDaniel |
| 6,524,987 B1 | 2/2003 | Collins |
| 6,548,441 B1 | 4/2003 | McDaniel |
| 6,548,442 B1 | 4/2003 | McDaniel |
| 6,576,583 B1 | 6/2003 | McDaniel |
| 6,576,586 B2 | 6/2003 | Siqin |
| 6,613,712 B1 | 9/2003 | McDaniel |
| 6,632,894 B1 | 10/2003 | McDaniel |
| 6,667,274 B1 | 12/2003 | Hawley |
| 6,750,302 B1 | 6/2004 | McDaniel |
| 6,833,415 B2 | 12/2004 | Kendrick |
| 7,026,494 B1 | 4/2006 | Yang |
| 7,041,617 B2 | 5/2006 | Jensen |
| 7,101,936 B2 | 9/2006 | Weng |
| 7,226,886 B2 | 6/2007 | Jayaratne |
| 7,294,599 B2 | 11/2007 | Jensen |
| 7,312,283 B2 | 12/2007 | Martin |
| 7,517,939 B2 | 4/2009 | Yang |
| 7,531,606 B2 | 5/2009 | Hendrickson |
| 7,598,327 B2 | 10/2009 | Shaw |
| 7,601,665 B2 | 10/2009 | McDaniel |
| 7,619,047 B2 | 11/2009 | Yang |
| 7,732,542 B2 | 6/2010 | Yang |
| 7,884,163 B2 | 2/2011 | McDaniel |
| 8,114,946 B2 | 2/2012 | Yang |
| 8,268,944 B2 | 9/2012 | Yang |
| 8,288,487 B2 | 10/2012 | Yang |
| 8,309,485 B2 | 11/2012 | Yang |
| 8,426,538 B2 | 4/2013 | Jensen |
| 8,623,973 B1 | 1/2014 | McDaniel |
| 8,822,608 B1 | 9/2014 | Bhandarkar |
| 8,829,137 B2* | 9/2014 | Lam .................. C08F 10/00 |
| | | 526/170 |
| 9,006,367 B2* | 4/2015 | McDaniel ............ C08J 5/18 |
| | | 526/348 |
| 9,023,959 B2 | 5/2015 | McDaniel |
| 9,096,745 B2* | 8/2015 | Lam ................... C08J 5/18 |
| 9,115,233 B2* | 8/2015 | Ker .................... C08F 4/65927 |
| 9,169,337 B2 | 10/2015 | Rohatgi |
| 9,181,370 B2* | 11/2015 | Sukhadia ............. C08F 210/14 |
| 9,273,170 B2 | 3/2016 | Hlavinka |
| 9,303,109 B2 | 4/2016 | Greco |
| 9,441,063 B2 | 9/2016 | Cruz |
| 9,745,230 B2 | 8/2017 | Small |
| 9,758,600 B1 | 9/2017 | Praetorius |
| 9,856,339 B2 | 1/2018 | Mariott |
| 9,975,976 B1* | 5/2018 | Tso ..................... C08F 210/16 |
| 10,000,594 B2* | 6/2018 | Hlavinka ............ C08L 23/0815 |
| 10,239,975 B2 | 3/2019 | McDaniel |
| 10,358,506 B2* | 7/2019 | Ding ................... C08L 23/0815 |
| 10,433,527 B2* | 10/2019 | Flavell ................ C07K 14/524 |
| 10,590,212 B2 | 3/2020 | Doufas |
| 10,604,604 B2 | 3/2020 | Yu |
| 10,954,321 B2 | 3/2021 | Lee |
| 11,014,997 B2* | 5/2021 | Ding ................... C08F 2/34 |
| 11,028,258 B2* | 6/2021 | Tso ..................... C08L 23/16 |
| 11,267,919 B2* | 3/2022 | Praetorius .......... B29C 49/0005 |
| 11,332,601 B2* | 5/2022 | Praetorius ............ C08L 23/06 |
| 11,339,279 B2* | 5/2022 | Ding ................... C08L 23/0815 |
| 11,578,156 B2* | 2/2023 | Praetorius .......... C08F 210/02 |
| 2010/0317904 A1 | 12/2010 | Small |
| 2011/0172322 A1 | 7/2011 | Michel |
| 2014/0256899 A1 | 9/2014 | Tso |
| 2015/0126692 A1* | 5/2015 | Sukhadia ............ C08L 23/0815 |
| | | 526/64 |
| 2015/0259444 A1 | 9/2015 | Rohatgi |
| 2019/0185594 A1 | 6/2019 | Dreng |
| 2020/0362064 A1 | 11/2020 | Ding |
| 2021/0139619 A1 | 5/2021 | Ding |
| 2023/0192909 A1 | 6/2023 | McDaniel |
| 2023/0192914 A1 | 6/2023 | McDaniel |

FOREIGN PATENT DOCUMENTS

| | | |
|---|---|---|
| CN | 104045902 B | 8/2017 |
| CN | 106459281 B | 8/2019 |
| CN | 108350113 B | 5/2021 |
| RU | 2155776 C2 | 9/2000 |
| WO | 2010147993 A1 | 12/2010 |
| WO | 2011037971 A1 | 3/2011 |
| WO | 2014134028 A1 | 9/2014 |
| WO | 2014164192 A1 | 10/2014 |
| WO | 2015069637 A2 | 5/2015 |
| WO | 2015179628 A1 | 11/2015 |
| WO | 2019086905 A1 | 5/2019 |
| WO | 2020231667 A1 | 11/2020 |
| WO | 2021253032 A1 | 12/2021 |
| WO | 2023114660 A1 | 6/2023 |
| WO | 2023114773 A1 | 6/2023 |

OTHER PUBLICATIONS

B.H. Zimm, et al., "The Dimensions of Chain Molecules Containing Branches and Rings," Journal of Chemical Physics, vol. 17, No. 12, Dec. 1949, pp. 1301-1314.

Bird, R. Byron, et al., "Dynamics of Polymeric Liquids," Fluid Mechanics, vol. 1, Second Edition, 1987, cover page, publishing page, pp. xiii-xviii, and 171-172, John Wiley & Sons, Inc.

Film Extrusion Manual—Process, Materials, Properties, TAPPI Press, 1992, 16 pages.

Helmut G. Alt and Alexander Köppl, "Effect of the Nature of Metallocene Complexes of Group IV Metals on Their Performance in Catalytic Ethylene and Propylene Polymerization," Laboratorium für Anorganische Chemie, Universität Bayreuth, D-95440 Bayreuth, Germany, Chem. Rev., 2000, 100 (4), pp. 1205-1221.

Hieber, C. A., et al., "Shear-rate-dependence modeling of polymer melt viscosity," Polymer Engineering and Science, Jul. 1992, pp. 931-938, vol. 32, No. 14.

Hieber, C. A., et al., "Some correlations involving the shear viscosity of polystyrene melts," Rheol Acta, 1989, pp. 321-332, vol. 28.

IUPAC Compendium of Chemical Terminology, 2nd Ed. 1997, pp. 1-1670.

Janzen, et al., "Diagnosing Long-Chain Branching in Polyethylene," Journal of Mol. Struct., 485/486, 1999, pp. 569-584.

M.L. Sentmanat, "Miniature Universal Testing Platform: From Extensional Melt Rheology to Solid-State Deformation Behavior," Rheol. Acta 43, 1999, pp. 657-669.

M.L. Sentmanat, et al., "Measuring the Transient Extensional Rheology of Polyethylene Melts Using the SER Universal Testing Platform," Journal of Rheology, vol. 49, 2005, pp. 585-606.

Modern Plastics Encyclopedia, Mid-Nov. 1995 Issue, vol. 72, No. 12, 3 pages.

Paul J. DesLauriers, et al., "Long-Chain Branching in PE From Cr/Aluminophosphate Catalysts," Applied Catalysts A: General 388, Elsevier, 2010, pp. 102-112.

Qing Yang, et al., "Alternative View of Long Chain Branch Formation by Metallocene Catalysts," Macromolecules No. 43, Sep. 16, 2010, pp. 8836-8852.

Youlu Yu, "A Short-Chain Branching Distribution Determination Technique for Polyethylene Using IR5-Detected GPC," Macromolecular Symposia, 2020, 390, 1900014, pp. 1-10.

Yu, Youlu, et al., "SEC-MALS method for the determination of long-chain branching and long-chain branching distribution in polyethylene," Polymer, 2005, pp. 5165-5182, vol. 46, Elsevier Ltd.

International Search Report and Written Opinion issued in related PCT Application No. PCT/US2022/080955, dated Apr. 6, 2023, 12 pp.

Takao Tayano, et al., "Morphology control of clay-mineral particles as supports for metallocene catalysts in propylene polymerization", Polyolefins Journal, Jun. 30, 2016 (Jun. 30, 2016), pp. 79-92, XP093031232, DOI: 10.22063/poj.2016.1291, Retrieved from the Internet: URL:http://poj.ippi.ac.ir/article_1291_c35 5dfcae15c711f05f70524120eeeb2.pdf retrieved on [Mar. 13, 2023].

(56) References Cited

OTHER PUBLICATIONS

Search Report issued in corresponding CN Application No. 2021800188748, dated Jun. 29, 2023, 2 pp.
Search Report issued in corresponding CN Application No. 2021800350639 dated Jun. 5, 2023, 3 pp.

* cited by examiner

DUAL CATALYST SYSTEM FOR PRODUCING LLDPE AND MDPE COPOLYMERS WITH LONG CHAIN BRANCHING FOR FILM APPLICATIONS

This application is a continuation application of U.S. patent application Ser. No. 16/837,009, filed on Apr. 1, 2020, now U.S. Pat. No. 11,339,279, the disclosure of which is incorporated herein by reference in its entirety.

BACKGROUND OF THE INVENTION

Polyolefins such as high density polyethylene (HDPE) homopolymer and copolymer and linear low density polyethylene (LLDPE) copolymer can be produced using various combinations of catalyst systems and polymerization processes. Ziegler-Natta and chromium-based catalyst systems can, for example, produce ethylene polymers having good extrusion processability, polymer melt strength in pipe and blow molding applications, and bubble stability in blown film applications, typically due to their broad molecular weight distribution (MWD). Metallocene-based catalyst systems can, for example, produce ethylene polymers having excellent impact and toughness properties, but often at the expense of poor extrusion processability, melt strength, and bubble stability.

In some end-uses, such as blown film, it can be beneficial to have the properties of a metallocene-catalyzed ethylene copolymer, but with improved processability, strain hardening, melt strength, and bubble stability. Accordingly, it is to these ends that the present invention is generally directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

The present invention generally relates to ethylene polymers (e.g., ethylene/α-olefin copolymers) characterized by a melt index of less than or equal to about 15 g/10 min, a density in a range from about 0.91 to about 0.945 g/cm$^3$, a CY-a parameter at 190° C. in a range from about 0.2 to about 0.6, an average number of long chain branches (LCBs) per 1,000,000 total carbon atoms of the polymer in a molecular weight range of 500,000 to 2,000,000 g/mol of less than or equal to about 5 (effectively, little to no long chain branching in the high molecular weight end), and a maximum ratio of $\eta_E/3\eta$ at an extensional rate of 0.03 sec$^{-1}$ in a range from about 3 to about 15 (the ratio of extensional viscosity to 3 times the shear viscosity; for Newtonian fluids, the ratio is 1, and strain hardening results in ratios greater than 1). Unexpectedly, there is substantially no long chain branching in the high molecular weight fraction of these polymers that might adversely impact film properties, such as tear resistance. Beneficially, however, there is a significant amount of long chain branching in the lower molecular weight fraction of the polymer, such that polymer melt strength and bubble stability are maintained. The ethylene polymers disclosed herein can be used to produce various articles of manufacture, such as blown films and cast films.

Another aspect of this invention is directed to a dual catalyst system, and in this aspect, the dual catalyst system can comprise catalyst component I comprising a single atom bridged metallocene compound with an indenyl group and a cyclopentadienyl group, catalyst component II comprising an unbridged hafnium metallocene compound with two cyclopentadienyl groups, an activator, and optionally, a co-catalyst.

In yet another aspect, an olefin polymerization process is provided, and in this aspect, the process can comprising contacting any catalyst composition disclosed herein with an olefin monomer and an optional olefin comonomer in a polymerization reactor system under polymerization conditions to produce an olefin polymer. For instance, the olefin monomer can be ethylene, and the olefin comonomer can be 1-butene, 1-hexene, 1-octene, or a mixture thereof.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects and embodiments may be directed to various feature combinations and sub-combinations described in the detailed description.

DEFINITIONS

Figure 1:
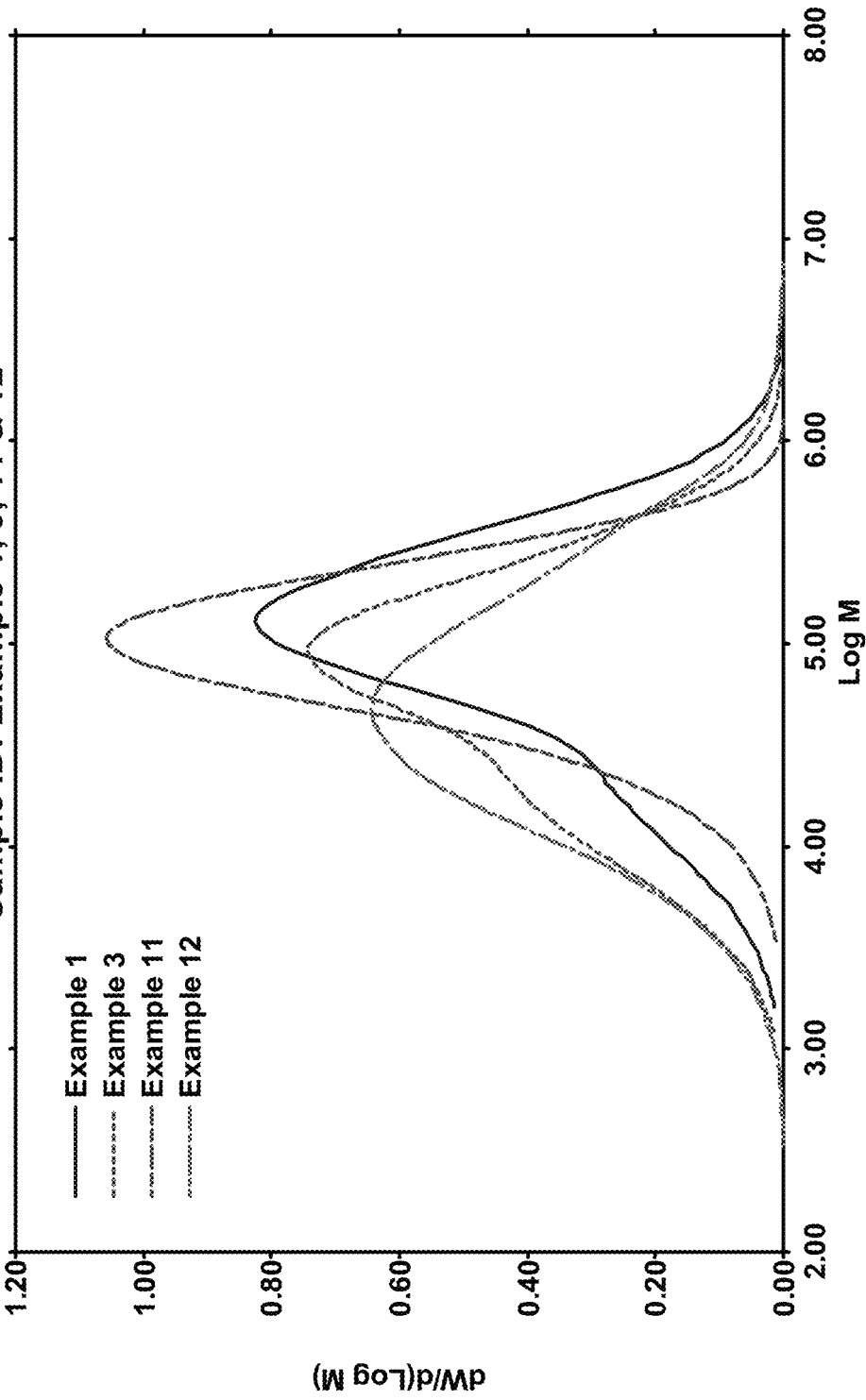
FIG. 1 presents a plot of the molecular weight distributions of the polymers of Examples 1, 3, and 11-12.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and/or feature disclosed herein, all combinations that do not detrimentally affect the designs, compositions, processes, and/or methods described herein are contemplated with or without explicit description of the particular combination. Additionally, unless explicitly recited otherwise, any aspect and/or feature disclosed herein can be combined to describe inventive features consistent with the present disclosure.

While compositions and methods are described herein in terms of "comprising" various components or steps, the compositions and methods also can "consist essentially of" or "consist of" the various components or steps, unless stated otherwise. For example, a catalyst composition consistent with aspects of the present invention can comprise; alternatively, can consist essentially of; or alternatively, can consist of; catalyst component I, catalyst component II, an activator, and a co-catalyst.

The terms "a," "an," "the," etc., are intended to include plural alternatives, e.g., at least one, unless otherwise specified. For instance, the disclosure of "an activator-support" or "a metallocene compound" is meant to encompass one, or mixtures or combinations of more than one, activator-support or metallocene compound, respectively, unless otherwise specified.

Generally, groups of elements are indicated using the numbering scheme indicated in the version of the periodic table of elements published in *Chemical and Engineering News,* 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

For any particular compound disclosed herein, the general structure or name presented is also intended to encompass all structural isomers, conformational isomers, and stereoisomers that can arise from a particular set of substituents, unless indicated otherwise. Thus, a general reference to a compound includes all structural isomers unless explicitly indicated otherwise; e.g., a general reference to pentane includes n-pentane, 2-methyl-butane, and 2,2-dimethylpropane, while a general reference to a butyl group includes an n-butyl group, a sec-butyl group, an iso-butyl group, and a tert-butyl group. Additionally, the reference to a general structure or name encompasses all enantiomers, diastereomers, and other optical isomers whether in enantiomeric or racemic forms, as well as mixtures of stereoisomers, as the context permits or requires. For any particular formula or name that is presented, any general formula or name presented also encompasses all conformational isomers, regioisomers, and stereoisomers that can arise from a particular set of substituents.

The term "substituted" when used to describe a group, for example, when referring to a substituted analog of a particular group, is intended to describe any non-hydrogen moiety that formally replaces a hydrogen in that group, and is intended to be non-limiting. A group or groups can also be referred to herein as "unsubstituted" or by equivalent terms such as "non-substituted," which refers to the original group in which a non-hydrogen moiety does not replace a hydrogen within that group. Unless otherwise specified, "substituted" is intended to be non-limiting and include inorganic substituents or organic substituents as understood by one of ordinary skill in the art.

The term "hydrocarbon" whenever used in this specification and claims refers to a compound containing only carbon and hydrogen. Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon). The term "hydrocarbyl group" is used herein in accordance with the definition specified by IUPAC: a univalent group formed by removing a hydrogen atom from a hydrocarbon (that is, a group containing only carbon and hydrogen). Non-limiting examples of hydrocarbyl groups include alkyl, alkenyl, aryl, and aralkyl groups, amongst other groups.

The term "polymer" is used herein generically to include olefin homopolymers, copolymers, terpolymers, and the like, as well as alloys and blends thereof. The term "polymer" also includes impact, block, graft, random, and alternating copolymers. A copolymer is derived from an olefin monomer and one olefin comonomer, while a terpolymer is derived from an olefin monomer and two olefin comonomers. Accordingly, "polymer" encompasses copolymers and terpolymers derived from any olefin monomer and comonomer(s) disclosed herein. Similarly, the scope of the term "polymerization" includes homopolymerization, copolymerization, and terpolymerization. Therefore, an ethylene polymer includes ethylene homopolymers, ethylene copolymers (e.g., ethylene/$\alpha$-olefin copolymers), ethylene terpolymers, and the like, as well as blends or mixtures thereof. Thus, an ethylene polymer encompasses polymers often referred to in the art as LLDPE (linear low density polyethylene) and HDPE (high density polyethylene). As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer can be categorized as an ethylene/1-hexene copolymer. The term "polymer" also includes all possible geometrical configurations, unless stated otherwise, and such configurations can include isotactic, syndiotactic, and random symmetries. Moreover, unless stated otherwise, the term "polymer" also is meant to include all molecular weight polymers, and is inclusive of lower molecular weight polymers.

The term "co-catalyst" is used generally herein to refer to compounds such as aluminoxane compounds, organoboron or organoborate compounds, ionizing ionic compounds, organoaluminum compounds, organozinc compounds, organomagnesium compounds, organolithium compounds, and the like, that can constitute one component of a catalyst composition, when used, for example, in addition to an activator-support. The term "co-catalyst" is used regardless of the actual function of the compound or any chemical mechanism by which the compound may operate.

The terms "chemically-treated solid oxide," "treated solid oxide compound," and the like, are used herein to indicate a solid, inorganic oxide of relatively high porosity, which can exhibit Lewis acidic or Brønsted acidic behavior, and which has been treated with an electron-withdrawing component, typically an anion, and which is calcined. The electron-withdrawing component is typically an electron-withdrawing anion source compound. Thus, the chemically-treated solid oxide can comprise a calcined contact product of at least one solid oxide with at least one electron-withdrawing anion source compound. Typically, the chemically-treated solid oxide comprises at least one acidic solid oxide compound. The "activator-support" of the present invention can be a chemically-treated solid oxide. The terms "support" and "activator-support" are not used to imply these components are inert, and such components should not be construed as an inert component of the catalyst composition. The term "activator," as used herein, refers generally to a substance that is capable of converting a metallocene component into a catalyst that can polymerize olefins, or converting a contact product of a metallocene component and a component that provides an activatable ligand (e.g., an alkyl, a hydride) to the metallocene, when the metallocene compound does not already comprise such a ligand, into a catalyst that can polymerize olefins. This term is used regardless of the actual activating mechanism. Illustrative activators include activator-supports, aluminoxanes, organoboron or organoborate compounds, ionizing ionic compounds, and the like. Aluminoxanes, organoboron or organoborate compounds, and ionizing ionic compounds generally are referred to as activators if used in a catalyst composition in which an activator-support is not present. If the catalyst composition contains an activator-support, then the aluminoxane, organoboron or organoborate, and ionizing ionic materials are typically referred to as co-catalysts.

The term "metallocene" as used herein describes compounds comprising at least one $\eta^3$ to $\eta^5$-cycloalkadienyl-type moiety, wherein $\eta^3$ to $\eta^5$-cycloalkadienyl moieties include cyclopentadienyl ligands, indenyl ligands, fluorenyl ligands, and the like, including partially saturated or substituted derivatives or analogs of any of these. Possible substituents on these ligands can include H, therefore this invention comprises ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like. In some contexts, the metallocene is referred to simply as the "catalyst," in much the same way the term "co-catalyst" is used herein to refer to, for example, an organoaluminum compound.

The terms "catalyst composition," "catalyst mixture," "catalyst system," and the like, do not depend upon the actual product or composition resulting from the contact or reaction of the initial components of the disclosed or claimed catalyst composition/mixture/system, the nature of the active catalytic site, or the fate of the co-catalyst, catalyst component I, catalyst component II, or the activator (e.g., activator-support), after combining these components. Therefore, the terms "catalyst composition," "catalyst mixture," "catalyst system," and the like, encompass the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, can be used interchangeably throughout this disclosure.

The term "contact product" is used herein to describe compositions wherein the components are contacted together in any order, in any manner, and for any length of time, unless otherwise specified. For example, the components can be contacted by blending or mixing. Further, contacting of any component can occur in the presence or absence of any other component of the compositions described herein. Combining additional materials or components can be done by any suitable method. Further, the term "contact product" includes mixtures, blends, solutions, slurries, reaction products, and the like, or combinations thereof. Although "contact product" can include reaction products, it is not required for the respective components to react with one another. Similarly, the term "contacting" is used herein to refer to materials which can be blended, mixed, slurried, dissolved, reacted, treated, or otherwise combined in some other manner.

Although any methods, devices, and materials similar or equivalent to those described herein can be used in the practice or testing of the invention, the typical methods, devices, and materials are herein described.

All publications and patents mentioned herein are incorporated herein by reference for the purpose of describing and disclosing, for example, the constructs and methodologies that are described in the publications, which might be used in connection with the presently described invention.

Several types of ranges are disclosed in the present invention. When a range of any type is disclosed or claimed, the intent is to disclose or claim individually each possible number that such a range could reasonably encompass, including end points of the range as well as any sub-ranges and combinations of sub-ranges encompassed therein. For example, when a chemical moiety having a certain number of carbon atoms is disclosed or claimed, the intent is to disclose or claim individually every possible number that such a range could encompass, consistent with the disclosure herein. For example, the disclosure that a moiety is a $C_1$ to $C_{18}$ hydrocarbyl group, or in alternative language, a hydrocarbyl group having from 1 to 18 carbon atoms, as used herein, refers to a moiety that can have 1, 2, 3, 4, 5, 6, 7, 8, 9, 10, 11, 12, 13, 14, 15, 16, 17, or 18 carbon atoms, as well as any range between these two numbers (for example, a $C_1$ to $C_8$ hydrocarbyl group), and also including any combination of ranges between these two numbers (for example, a $C_2$ to $C_4$ and a $C_{12}$ to $C_{16}$ hydrocarbyl group).

Similarly, another representative example follows for the ratio of Mw/Mn of an ethylene polymer consistent with aspects of this invention. By a disclosure that the ratio of Mw/Mn can be in a range from about 3 to about 10, the intent is to recite that the ratio of Mw/Mn can be any ratio in the range and, for example, can be equal to about 3, about 4, about 5, about 6, about 7, about 8, about 9, or about 10. Additionally, the ratio of Mw/Mn can be within any range from about 3 to about 10 (for example, from about 3.5 to about 6), and this also includes any combination of ranges between about 3 and about 10 (for example, the Mw/Mn ratio can be in a range from about 3 to about 5, or from about 6 to about 8). Further, in all instances, where "about" a particular value is disclosed, then that value itself is disclosed. Thus, the disclosure that the ratio of Mw/Mn can be from about 3 to about 10 also discloses a ratio of Mw/Mn from 3 to 10 (for example, from 3.5 to 6), and this also includes any combination of ranges between 3 and 10 (for example, the Mw/Mn ratio can be in a range from 3 to 5, or from 6 to 8). Likewise, all other ranges disclosed herein should be interpreted in a manner similar to these examples.

The term "about" means that amounts, sizes, formulations, parameters, and other quantities and characteristics are not and need not be exact, but can be approximate and/or larger or smaller, as desired, reflecting tolerances, conversion factors, rounding off, measurement errors, and the like, and other factors known to those of skill in the art. In general, an amount, size, formulation, parameter or other quantity or characteristic is "about" or "approximate" whether or not expressly stated to be such. The term "about" also encompasses amounts that differ due to different equilibrium conditions for a composition resulting from a particular initial mixture. Whether or not modified by the term "about," the claims include equivalents to the quantities. The term "about" can mean within 10% of the reported numerical value, preferably within 5% of the reported numerical value.

DETAILED DESCRIPTION OF THE INVENTION

The present invention is directed generally to low and medium density ethylene-based polymers having excellent strength and toughness properties, but with improved tear strength without sacrificing processability, strain hardening, melt strength, and bubble stability. Articles produced from these ethylene-based polymers can include blown films and cast films.

Generally, metallocene-derived ethylene-based polymers with long chain branches have those long chain branches concentrated in the high molecular weight fraction of the polymer. However, these (high molecular weight) long chain branches can be detrimental to tear resistance, such as seen in low MD Elmendorf tear strengths in blown films and cast films. Advantageously, the ethylene polymers disclosed herein have substantially no long chain branching in the high molecular weight fraction of the polymer; instead, significant amounts of long chain branching are present in the lower molecular weight fraction of the polymer.

These ethylene polymers can be produced, for example, with a dual metallocene catalyst system in a single reactor. It was found that using a first metallocene catalyst that preferentially produces lower molecular weight polyethylene with relatively high LCB content in combination with a second metallocene catalyst that preferentially produces higher molecular weight polyethylene with low levels of LCB content can result in the unique combination of polymer properties described herein.

Ethylene Polymers

Generally, the polymers disclosed herein are ethylene-based polymers, or ethylene polymers, encompassing homopolymers of ethylene as well as copolymers, terpolymers, etc., of ethylene and at least one olefin comonomer. Comonomers that can be copolymerized with ethylene often can have from 3 to 20 carbon atoms in their molecular chain. For example, typical comonomers can include, but are not limited to, propylene, 1-butene, 1-pentene, 1-hexene, 1-heptene, 1-octene, and the like, or combinations thereof. In an aspect, the olefin comonomer can comprise a $C_3$-$C_{18}$ olefin; alternatively, the olefin comonomer can comprise a $C_3$-$C_{10}$ olefin; alternatively, the olefin comonomer can comprise a $C_4$-$C_{10}$ olefin; alternatively, the olefin comonomer can comprise a $C_3$-$C_{10}$ α-olefin; alternatively, the olefin comonomer can comprise a $C_4$-$C_{10}$ α-olefin; alternatively, the olefin comonomer can comprise 1-butene, 1-hexene, 1-octene, or any combination thereof, or alternatively, the comonomer can comprise 1-hexene.

Typically, the amount of the comonomer, based on the total weight of monomer (ethylene) and comonomer, can be in a range from about 0.01 to about 20 wt. %, from about 0.1 to about 10 wt. %, from about 0.5 to about 15 wt. %, from about 0.5 to about 8 wt. %, or from about 1 to about 15 wt. %.

In one aspect, the ethylene polymer of this invention can comprise an ethylene/α-olefin copolymer, while in another aspect, the ethylene polymer can comprise an ethylene homopolymer, and in yet another aspect, the ethylene polymer of this invention can comprise an ethylene/α-olefin copolymer and an ethylene homopolymer. For example, the ethylene polymer can comprise an ethylene/1-butene copolymer, an ethylene/1-hexene copolymer, an ethylene/1-octene copolymer, an ethylene homopolymer, or any combination thereof, alternatively, an ethylene/1-butene copolymer, an ethylene/1-hexene copolymer, an ethylene/1-octene copolymer, or any combination thereof, or alternatively, an ethylene/1-hexene copolymer.

An illustrative and non-limiting example of an ethylene polymer (e.g., comprising an ethylene copolymer) of the present invention can have a melt index of less than or equal to about 15 g/10 min, a density in a range from about 0.91 to about 0.945 g/cm³, a CY-a parameter at 190° C. in a range from about 0.2 to about 0.6, an average number of long chain branches (LCBs) per 1,000,000 total carbon atoms of the polymer in a molecular weight range of 500,000 to 2,000,000 g/mol of less than or equal to about 5, and a maximum ratio of $\eta_E/3\eta$ at an extensional rate of 0.03 sec⁻¹ in a range from about 3 to about 15. This ethylene polymer also can have any of the polymer properties listed below and in any combination, unless indicated otherwise.

The densities of ethylene-based polymers disclosed herein often are greater than or equal to about 0.91 g/cm³, and less than or equal to about 0.945 g/cm³. Yet, in particular aspects, the density can be in a range from about 0.91 to about 0.94 g/cm³, from about 0.92 to about 0.945 g/cm³, from about 0.92 to about 0.94 g/cm³, from about 0.925 to about 0.945 g/cm³, or from about 0.922 to about 0.942 g/cm³.

Ethylene polymers described herein often can have a melt index (MI) of less than or equal to about 15 g/10 min, less than or equal to about 10 g/10 min, or less than or equal to about 5 g/10 min. In further aspects, ethylene polymers described herein can have a melt index (MI) in a range from about 0.1 to about 10 g/10 min, from about 0.2 to about 5 g/10 min, from about 0.4 to about 4 g/10 min, or from about 0.75 to about 2.75 g/10 min.

While not being limited thereto, the ethylene polymer also can have a high load melt index (HLMI) in a range from 0 to about 300 g/10 min; alternatively, from about 5 to about 100 g/10 min; alternatively, from about 10 to about 85 g/10 min; or alternatively, from about 25 to about 75 g/10 min.

The ratio of high load melt index (HLMI) to melt index (MI), referred to as the ratio of HLMI/MI, is not particularly limited, but typically ranges from about 15 to about 90, from about 15 to about 80, from about 20 to about 80, from about 20 to about 60, or from about 20 to about 40. In this HLMI/MI ratio, the melt index is not equal to zero.

Unexpectedly, the ethylene polymers described herein can have a maximum ratio of $\eta_E/3\eta$ at an extensional rate of 0.03 sec⁻¹ in a range from about 3 to about 15. For Newtonian fluids, the ratio of extensional viscosity to 3 times the shear viscosity is equal to 1, while the strain hardening due to long chain branching can lead to ratios of greater than 1. In one aspect, the maximum ratio of $\eta_E/3\eta$ at the extensional rate of 0.03 sec-1 can range from about 3 to about 10, or from about 4 to about 10, while in another aspect, the maximum ratio can range from about 4 to about 15, or from about 4 to about 12, and in yet another aspect, the maximum ratio can range from about 5 to about 11, or from about 5 to about 9. These ratios of extensional viscosity to three times the shear viscosity are determined using a Sentmanat Extensional Rheometer (SER) at 150° C.

Additionally, while not being limited thereto, the ethylene polymer can be characterized further by a maximum ratio of $\eta_E/3\eta$ at an extensional rate of 0.1 sec⁻¹ in a range from about 2 to about 10; alternatively, from about 2 to about 8; alternatively, from about 2 to about 6; alternatively, from about 3 to about 9; or alternatively, from about 3 to about 7.

In an aspect, ethylene polymers described herein can have a ratio of Mw/Mn, or the polydispersity index, in a range from about 3 to about 10, from about 3.5 to about 10, from about 3.5 to about 8, from about 3 to about 6, or from about 3.5 to about 6. Additionally or alternatively, the ethylene polymer can have a ratio of Mz/Mw in a range from about 2 to about 5, from about 2 to about 4.5, from about 2.2 to about 5, or from about 2.2 to about 4.

In an aspect, ethylene polymers described herein can have a weight-average molecular weight (Mw) in a range from about 50,000 to about 250,000 g/mol, from about 60,000 to about 200,000 g/mol, from about 70,000 to about 185,000 g/mol, from about 65,000 to about 175,000 g/mol, or from about 80,000 to about 140,000 g/mol.

Additionally or alternatively, the ethylene polymer can have a number-average molecular weight (Mn) in a range from about 10,000 to about 50,000 g/mol, from about 10,000 to about 40,000 g/mol, from about 10,000 to about 38,000 g/mol, or from about 12,000 to about 30,000 g/mol. Additionally or alternatively, the ethylene polymer can have a z-average molecular weight (Mz) in a range from about 150,000 to about 600,000 g/mol, from about 200,000 to about 550,000 g/mol, from about 200,000 to about 500,000 g/mol, or from about 220,000 to about 450,000 g/mol.

In accordance with certain aspects of this invention, the IB parameter from a molecular weight distribution curve (plot of dW/d(Log M) vs. Log M; normalized to an area equal to 1) can be an important characteristic of the ethylene polymers described herein. The IB parameter is often referred to as the integral breadth, and is defined as $1/[dW/d(Log M)]_{MAX}$. Generally, the IB parameter of the ethylene polymers consistent with this invention can be in a range from about 1 to about 2, from about 1 to about 1.8, or from about 1 to about 1.7. In one aspect, the ethylene polymer can be characterized by an IB parameter in a range from about 1.1 to about 1.8, and in another aspect, from about 1.1 to about 1.7, and in yet another aspect, from about 1.15 to about 1.75.

While not limited thereto, ethylene polymers described herein can have a zero-shear viscosity at 190° C. in a range from about 1000 to about 1,000,000 Pa-sec, from about 1000 to about 50,000 Pa-sec, or from about 2000 to about 10,000 Pa-sec. Moreover, these ethylene polymers can have a CY-a parameter from about 0.2 to about 0.6, such as from about 0.25 to about 0.55, from about 0.3 to about 0.6, from about 0.3 to about 0.55, or from about 0.32 to about 0.52. Additionally or alternatively, these ethylene polymers can have a relatively short relaxation time, typically in a range from about 0.001 to about 0.15 sec, such as from about 0.002 to about 0.1 sec, or from about 0.002 to about 0.025 sec. The zero-shear viscosity, the CY-a parameter, and the relaxation time are determined from viscosity data measured at 190° C. and using the Carreau-Yasuda (CY) empirical model as described herein.

The average number of long chain branches (LCBs) per 1,000,000 total carbon atoms of the ethylene polymer in a molecular weight range of 500,000 to 2,000,000 g/mol is less than or equal to about 5 (there is effectively no LCB in the high molecular weight fraction of the polymer). All average numbers of LCBs disclosed herein are number-average numbers. In some aspects, the average number of long chain branches (LCBs) per 1,000,000 total carbon atoms of the polymer in the molecular weight range of 500,000 to 2,000,000 g/mol can be less than or equal to about 4, less than or equal to about 3, less than or equal to about 2, or less than or equal to about 1. In further aspects, the average number of LCBs in this molecular weight range can be below the detection limit.

In the overall polymer (using the Janzen-Colby model), the ethylene polymers typically have levels of long chain branches (LCBs) in a range from about 1 to about 10 LCBs, from about 1 to about 8 LCBs, from about 1 to about 7 LCBs, or from about 1 to about 6 LCBs, per 1,000,000 total carbon atoms.

Moreover, the ethylene polymers typically have a conventional short chain branching distribution (the SCB content decreases with molecular weight). This SCBD feature is quantified herein by the number of short chain branches (SCBs) per 1000 total carbon atoms of the ethylene polymer at the number-average molecular weight (Mn) that is greater (by any amount disclosed herein, e.g., at least 50% greater, or at least 100% greater, or at least 200% greater, or at least 300% greater), than at the weight-average molecular weight (Mw), and/or the number of SCBs per 1000 total carbon atoms of the ethylene polymer at Mn is greater (by any amount disclosed herein) than at the z-average molecular weight (Mz), and/or the number of SCBs per 1000 total carbon atoms of the ethylene polymer at Mw that is greater (by any amount disclosed herein) than at Mz. These numbers of SCBs disclosed herein are number-average numbers.

In accordance with certain aspects of this invention, the ethylene polymers described herein can have a unique analytic TREF (ATREF) profile. For instance, the ethylene polymer can have a peak ATREF temperature (temperature of the highest peak on the ATREF curve in the 40-110° C. range) of from about 83 to about 103° C., or from about 85 to about 100° C. In some aspects, the peak ATREF temperature can be in a range from about 88 to about 98° C., or from about 90 to about 96° C.

Further, the ethylene polymer (e.g., the ethylene/α-olefin copolymer) can have an ATREF profile characterized by from about 0.5 to about 6 wt. % (or from about 1 to about 5 wt. %, or from about 1.5 to about 4.5 wt. %) of the polymer eluting below a temperature of 40° C.; by from about 12 to about 26 wt. % (or from about 13 to about 24 wt. %, or from about 14 to about 23 wt. %) of the polymer eluting between 40 and 76° C.; by from about 52 to about 82 wt. % (or from about 55 to about 80 wt. %, or from about 58 to about 75 wt. %) of the polymer eluting above a temperature of 86° C.; and the remainder of the polymer (to reach 100 wt. %) eluting between 76 and 86° C.

In an aspect, the ethylene polymer described herein can be a reactor product (e.g., a single reactor product), for example, not a post-reactor blend of two polymers, for instance, having different molecular weight characteristics. As one of skill in the art would readily recognize, physical blends of two different polymer resins can be made, but this necessitates additional processing and complexity not required for a reactor product. Additionally, the ethylene polymer can further contain any suitable additive, non-limiting examples of which include an antioxidant, an acid scavenger, an antiblock additive, a slip additive, a colorant, a filler, a polymer processing aid, a UV additive, and the like, as well as any combination thereof.

Moreover, the ethylene polymers can be produced with a metallocene catalyst system containing zirconium and hafnium, discussed further below. Ziegler-Natta, chromium, and titanium metallocene based catalysts systems are not required. Therefore, the ethylene polymer can contain no measurable amount of chromium or titanium (catalyst residue), i.e., less than 0.1 ppm by weight. In some aspects, the ethylene polymer can contain, independently, less than 0.08 ppm, less than 0.05 ppm, or less than 0.03 ppm, of chromium and titanium.

Articles and Products

Articles of manufacture can be formed from, and/or can comprise, the olefin polymers (e.g., ethylene polymers) of this invention and, accordingly, are encompassed herein. For example, articles which can comprise the polymers of this invention can include, but are not limited to, an agricultural film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product, outdoor play equipment, a pipe, a sheet or tape, a toy, or a traffic barrier, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers often are added to these polymers in order to provide beneficial polymer processing or end-use product attributes. Such processes and materials are described in *Modern Plastics Encyclopedia*, Mid-November 1995 Issue, Vol. 72, No. 12; and *Film Extrusion Manual—Process, Materials, Properties*, TAPPI Press, 1992; the disclosures of which are incorporated herein by reference in their entirety. In some aspects of this invention, an article of manufacture can comprise any of olefin polymers (or ethylene polymers) described herein, and the article of manufacture can be or can comprise a blown film, a cast film, a pipe, or a blow molded product.

In some aspects, the article produced from and/or comprising an ethylene polymer of this invention is a film product. For instance, the film can be a blown film or a cast film that is produced from and/or comprises any of the ethylene polymers disclosed herein. Such films also can contain one or more additives, non-limiting examples of which can include an antioxidant, an acid scavenger, an antiblock additive, a slip additive, a colorant, a filler, a processing aid, a UV inhibitor, and the like, as well as combinations thereof.

Also contemplated herein is a method for forming or preparing an article of manufacture comprising any polymer disclosed herein. For instance, a method can comprise (i) contacting a catalyst composition with an olefin monomer (e.g., ethylene) and an optional olefin comonomer under polymerization conditions in a polymerization reactor system to produce an olefin polymer (e.g., an ethylene polymer), wherein the catalyst composition can comprise catalyst component I, catalyst component II, an activator (e.g., an activator-support comprising a solid oxide treated with an electron-withdrawing anion), and an optional co-catalyst (e.g., an organoaluminum compound); and (ii) forming an article of manufacture comprising the olefin polymer (or ethylene polymer). The forming step can comprise blending, melt processing, extruding, molding, or thermoforming, and the like, including combinations thereof. Any suitable additive can be combined with the polymer in the melt processing step (extrusion step), such as antioxidants, acid scavengers, antiblock additives, slip additives, colorants, fillers, processing aids, UV inhibitors, and the like, as well as combinations thereof.

Films disclosed herein, whether cast or blown, can be any thickness that is suitable for the particular end-use application, and often, the average film thickness can be in a range from about 0.25 to about 250 mils, or from about 0.5 to about 20 mils. For certain film applications, typical average thicknesses can be in a range from about 0.25 to about 8 mils, from about 0.5 to about 8 mils, from about 0.8 to about 5 mils, or from about 0.7 to about 2 mils.

In an aspect and unexpectedly, the blown films or cast films disclosed herein can have excellent tear resistance. Further, such films also can generally have low haze and good optical properties. For instance, the tear resistance of the films described herein can be characterized by the MD (or TD) Elmendorf tear strength. Suitable ranges for the MD tear strength can include, but are not limited to, from about 40 to about 400 g/mil, from about 40 to about 250 g/mil, from about 40 to about 150 g/mil, from about 45 to about 450 g/mil, from about 45 to about 200 g/mil, from about 50 to about 350 g/mil, or from about 50 to about 150 g/mil, and the like. Typical ranges for the TD tear strength can include, but are not limited to, from about 75 to about 600 g/mil, from about 100 to about 700 g/mil, from about 100 to about 550 g/mil, or from about 120 to about 550 g/mil, and the like.

While not being limited thereto, the blown film or cast film can have a ratio of MD Elmendorf tear strength to TD Elmendorf tear strength (MD:TD) in a range from about 0.15:1 to about 0.7:1, such as from about 0.15:1 to about 0.55:1, from about 0.2:1 to about 0.5:1, from about 0.2:1 to about 0.45:1, or from about 0.25:1 to about 0.5:1.

The film products encompassed herein also can be characterized by very good optical properties, such as low haze. As one of skill in the art would readily recognize, certain additives can adversely impact haze and other optical properties, for example, slip and antiblock additives. Nonetheless, the film products encompassed herein can have a haze (with or without additives) of less than or equal to about 10%, or less than or equal to about 9%, and often can have haze values ranging from about 2 to about 10%, from about 3 to about 10%, from about 4 to about 9%, or from about 5 to about 10%, and the like.

Catalyst Systems and Polymerization Processes

In accordance with aspects of the present invention, the olefin polymer (e.g., the ethylene polymer) can be produced using a dual catalyst system. In these aspects, catalyst component I can comprise any suitable single atom bridged metallocene compound with an indenyl group and a cyclopentadienyl group, or any single atom bridged metallocene compound with an indenyl group and a cyclopentadienyl group disclosed herein. Catalyst component II can comprise any suitable unbridged hafnium metallocene compound with two cyclopentadienyl groups, or any unbridged hafnium metallocene compound with two cyclopentadienyl groups disclosed herein. The catalyst system also can comprise any suitable activator or any activator disclosed herein, and optionally, any suitable co-catalyst or any co-catalyst disclosed herein.

Referring first to catalyst component I, which can comprise a single atom bridged metallocene compound with an indenyl group and a cyclopentadienyl group. In some aspects, at least one of the indenyl group and the cyclopentadienyl group can be substituted. Thus, the indenyl group can be substituted, the cyclopentadienyl group can be substituted, or both the indenyl group and the cyclopentadienyl group can be substituted. For example, the metallocene compound can have an unsubstituted cyclopentadienyl group and an alkyl-substituted indenyl group, such as a $C_1$ to $C_6$ alkyl group. The single atom bridge can be a single carbon bridging atom or a single silicon bridging atom, which can have two substituents independently selected from H or a $C_1$ to $C_{18}$ hydrocarbyl group, or from H or a $C_1$ to $C_6$ alkyl group, and the like. The metal of the metallocene compound is not particularly limited, but generally, catalyst component I is a zirconium-based metallocene.

Catalyst component I can comprise, in particular aspects of this invention, a bridged metallocene compound having formula (A):

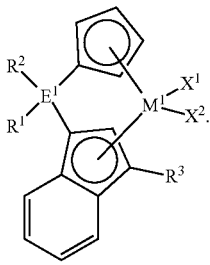
(A)

Within formula (A), $M^1$, $R^1$, $R^2$, $R^3$, $E^1$, $X^1$, and $X^2$ are independent elements of the bridged metallocene compound. Accordingly, the bridged metallocene compound having formula (A) can be described using any combination of $M^1$, $R^1$, $R^2$, $R^3$, $E^1$, $X^1$, and $X^2$ disclosed herein.

In accordance with aspects of this invention, the metal in formula (A), $M^1$, can be Ti, Zr, or Hf. In one aspect, for instance, $M^1$ can be Zr or Hf, while in another aspect, $M^1$ can be Ti; alternatively, $M^1$ can be Zr; or alternatively, $M^1$ can be Hf.

$X^1$ and $X^2$ in formula (A) independently can be a monoanionic ligand. In some aspects, suitable monoanionic ligands can include, but are not limited to, H (hydride), $BH_4$, a halide, a $C_1$ to $C_{36}$ hydrocarbyl group, a $C_1$ to $C_{36}$ hydrocarboxy group, a $C_1$ to $C_{36}$ hydrocarbylaminyl group, a $C_1$ to $C_{36}$ hydrocarbylsilyl group, a $C_1$ to $C_{36}$ hydrocarbylaminylsilyl group, —$OBR^A{}_2$, or —$OSO_2R^A$, wherein $R^A$ is a $C_1$ to $C_{36}$ hydrocarbyl group. It is contemplated that $X^1$ and $X^2$ can be either the same or a different monoanionic ligand. In addition to representative selections for $X^1$ and $X^2$ that are disclosed herein, additional suitable hydrocarbyl groups, hydrocarboxy groups, hydrocarbylaminyl groups, hydrocarbylsilyl groups, and hydrocarbylaminylsilyl groups are disclosed, for example, in U.S. Pat. No. 9,758,600, incorporated herein by reference in its entirety.

In one aspect, $X^1$ and $X^2$ independently can be H, $BH_4$, a halide (e.g., F, Cl, Br, etc.), a $C_1$ to $C_{18}$ hydrocarbyl group, a $C_1$ to $C_{18}$ hydrocarboxy group, a $C_1$ to $C_{18}$ hydrocarbylaminyl group, a $C_1$ to $C_{18}$ hydrocarbylsilyl group, or a $C_1$ to $C_{18}$ hydrocarbylaminylsilyl group. Alternatively, $X^1$ and $X^2$ independently can be H, $BH_4$, a halide, $OBR^A{}_2$, or $OSO_2R^A$, wherein $R^A$ is a $C_1$ to $C_{18}$ hydrocarbyl group. In another aspect, $X^1$ and $X^2$ independently can be H, $BH_4$, a halide, a $C_1$ to $C_{12}$ hydrocarbyl group, a $C_1$ to $C_{12}$ hydrocarboxy group, a $C_1$ to $C_{12}$ hydrocarbylaminyl group, a $C_1$ to $C_{12}$ hydrocarbylsilyl group, a $C_1$ to $C_{12}$ hydrocarbylaminylsilyl group, $OBR^A{}_2$, or $OSO_2R^A$, wherein $R^A$ is a $C_1$ to $C_{12}$ hydrocarbyl group. In another aspect, $X^1$ and $X^2$ independently can be H, $BH_4$, a halide, a $C_1$ to $C_{10}$ hydrocarbyl group, a $C_1$ to $C_{10}$ hydrocarboxy group, a $C_1$ to $C_{10}$ hydrocarbylaminyl group, a $C_1$ to $C_{10}$ hydrocarbylsilyl group, a $C_1$ to $C_{10}$ hydrocarbylaminylsilyl group, $OBR^A{}_2$, or $OSO_2R^A$, wherein $R^A$ is a $C_1$ to $C_{10}$ hydrocarbyl group. In yet another aspect, $X^1$ and $X^2$ independently can be H, $BH_4$, a halide, a $C_1$ to $C_8$ hydrocarbyl group, a $C_1$ to $C_8$ hydrocarboxy group, a $C_1$ to $C_8$ hydrocarbylaminyl group, a $C_1$ to $C_8$ hydrocarbylsilyl group, a $C_1$ to $C_8$ hydrocarbylaminylsilyl group, $OBR^A{}_2$, or $OSO_2R^A$, wherein $R^A$ is a $C_1$ to $C_8$ hydrocarbyl group. In still another aspect, $X^1$ and $X^2$ independently can be a halide or a $C_1$ to $C_{18}$ hydrocarbyl group. For example, $X^1$ and $X^2$ can be $C_1$.

In one aspect, $X^1$ and $X^2$ independently can be H, $BH_4$, a halide, or a $C_1$ to $C_{36}$ hydrocarbyl group, hydrocarboxy group, hydrocarbylaminyl group, hydrocarbylsilyl group, or hydrocarbylaminylsilyl group, while in another aspect, $X^1$ and $X^2$ independently can be H, $BH_4$, or a $C_1$ to $C_{18}$ hydrocarboxy group, hydrocarbylaminyl group, hydrocarbylsilyl group, or hydrocarbylaminylsilyl group. In yet another aspect, $X^1$ and $X^2$ independently can be a halide; alternatively, a $C_1$ to $C_{18}$ hydrocarbyl group; alternatively, a $C_1$ to $C_{18}$ hydrocarboxy group; alternatively, a $C_1$ to $C_{18}$ hydrocarbylaminyl group; alternatively, a $C_1$ to $C_{18}$ hydrocarbylsilyl group; or alternatively, a $C_1$ to $C_{18}$ hydrocarbylaminylsilyl group. In still another aspect, $X^1$ and $X^2$ can be H; alternatively, F; alternatively, Cl; alternatively, Br; alternatively, I; alternatively, $BH_4$; alternatively, a $C_1$ to $C_{18}$ hydrocarbyl group; alternatively, a $C_1$ to $C_{18}$ hydrocarboxy group; alternatively, a $C_1$ to $C_{18}$ hydrocarbylaminyl group; alternatively, a $C_1$ to $C_{18}$ hydrocarbylsilyl group; or alternatively, a $C_1$ to $C_{18}$ hydrocarbylaminylsilyl group.

$X^1$ and $X^2$ independently can be, in some aspects, H, a halide, methyl, phenyl, benzyl, an alkoxy, an aryloxy, acetylacetonate, formate, acetate, stearate, oleate, benzoate, an alkylaminyl, a dialkylaminyl, a trihydrocarbylsilyl, or a hydrocarbylaminylsilyl; alternatively, H, a halide, methyl, phenyl, or benzyl; alternatively, an alkoxy, an aryloxy, or acetylacetonate; alternatively, an alkylaminyl or a dialkylaminyl; alternatively, a trihydrocarbylsilyl or hydrocarbylaminylsilyl; alternatively, H or a halide; alternatively, methyl, phenyl, benzyl, an alkoxy, an aryloxy, acetylacetonate, an alkylaminyl, or a dialkylaminyl; alternatively, H; alternatively, a halide; alternatively, methyl; alternatively, phenyl; alternatively, benzyl; alternatively, an alkoxy; alternatively, an aryloxy; alternatively, acetylacetonate; alternatively, an alkylaminyl; alternatively, a dialkylaminyl; alternatively, a trihydrocarbylsilyl; or alternatively, a hydrocarbylaminylsilyl. In these and other aspects, the alkoxy, aryloxy, alkylaminyl, dialkylaminyl, trihydrocarbylsilyl, and hydrocarbylaminylsilyl can be a $C_1$ to $C_{36}$, a $C_1$ to $C_{18}$, a $C_1$ to $C_{12}$, or a $C_1$ to $C_8$ alkoxy, aryloxy, alkylaminyl, dialkylaminyl, trihydrocarbylsilyl, and hydrocarbylaminylsilyl.

Moreover, $X^1$ and $X^2$ independently can be, in certain aspects, a halide or a $C_1$ to $C_{18}$ hydrocarbyl group; alternatively, a halide or a $C_1$ to $C_8$ hydrocarbyl group; alternatively, F, Cl, Br, I, methyl, benzyl, or phenyl; alternatively, Cl, methyl, benzyl, or phenyl; alternatively, a $C_1$ to $C_{18}$ alkoxy, aryloxy, alkylaminyl, dialkylaminyl, trihydrocarbylsilyl, or hydrocarbylaminylsilyl group; alternatively, a $C_1$ to $C_8$ alkoxy, aryloxy, alkylaminyl, dialkylaminyl, trihydrocarbylsilyl, or hydrocarbylaminylsilyl group; or alternatively, methyl, ethyl, propyl, butyl, pentyl, hexyl, heptyl, octyl, nonyl, decyl, ethenyl, propenyl, butenyl, pentenyl, hexenyl, heptenyl, octenyl, nonenyl, decenyl, phenyl, tolyl, benzyl, naphthyl, trimethylsilyl, triisopropylsilyl, triphenylsilyl, or allyldimethylsilyl.

In formula (A), $E^1$ can be C or Si, and $R^1$ and $R^2$ independently can be H or a $C_1$ to $C_{18}$ hydrocarbyl group (e.g., a $C_1$ to $C_8$ hydrocarbyl group; a $C_1$ to $C_{12}$ alkyl group; or methyl, ethyl, propyl, butyl, pentyl, or hexyl). Alternatively, $R^1$ and $R^2$ can be connected to a form a cyclic or heterocyclic group having up to 18 carbon atoms or, alternatively, up to 12 carbon atoms. Cyclic groups include cycloalkyl and cycloalkenyl moieties and such moieties can include, but are not limited to, cyclopentyl, cyclopentenyl, cyclohexyl, cyclohexenyl, and the like. For instance, bridging atom $E^1$, $R^1$, and $R^2$ can form a cyclopentyl or cyclohexyl moiety. Heteroatom-substituted cyclic groups can be formed with nitrogen, oxygen, or sulfur heteroatoms. While these heterocyclic groups can have up to 12 or 18 carbons atoms, the heterocyclic groups can be 3-membered, 4-membered, 5-membered, 6-membered, or 7-membered groups in some aspects of this invention.

$R^3$ in formula (A) can be H or a hydrocarbyl or hydrocarbylsilyl group having up to 18 carbon atoms. In one aspect, $R^3$ can be hydrocarbyl group having up to 12 carbon atoms, while in another aspect, $R^3$ can be a hydrocarbylsilyl group having up to 12 carbon atoms (e.g., $R^3$ can be trimethylsilyl). In another aspect, $R^3$ can be H, methyl, ethyl, propyl, butyl, pentyl, hexyl, heptyl, octyl, nonyl, decyl, ethenyl, propenyl, butenyl, pentenyl, hexenyl, heptenyl, octenyl, nonenyl, decenyl, phenyl, tolyl, or benzyl. In yet another aspect, $R^3$ can be an alkyl or a terminal alkenyl group having up to 8 carbon atoms, or alternatively, up to 6 carbon atoms. In still another aspect, $R^3$ can be methyl, ethyl, propyl, butyl, pentyl, or hexyl.

Illustrative and non-limiting examples of bridged metallocene compounds having formula (A) and/or suitable for use as catalyst component I can include the following compounds (Me=methyl, Et=ethyl, Pr=propyl, Bu=butyl, Ph=phenyl):

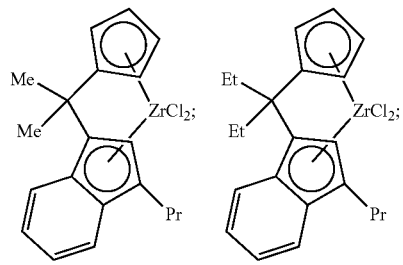

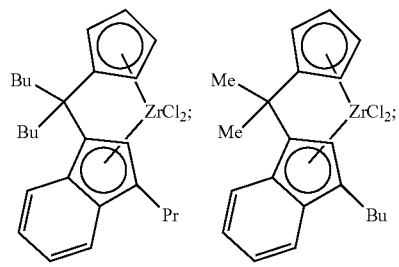

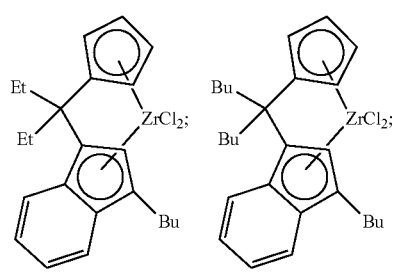

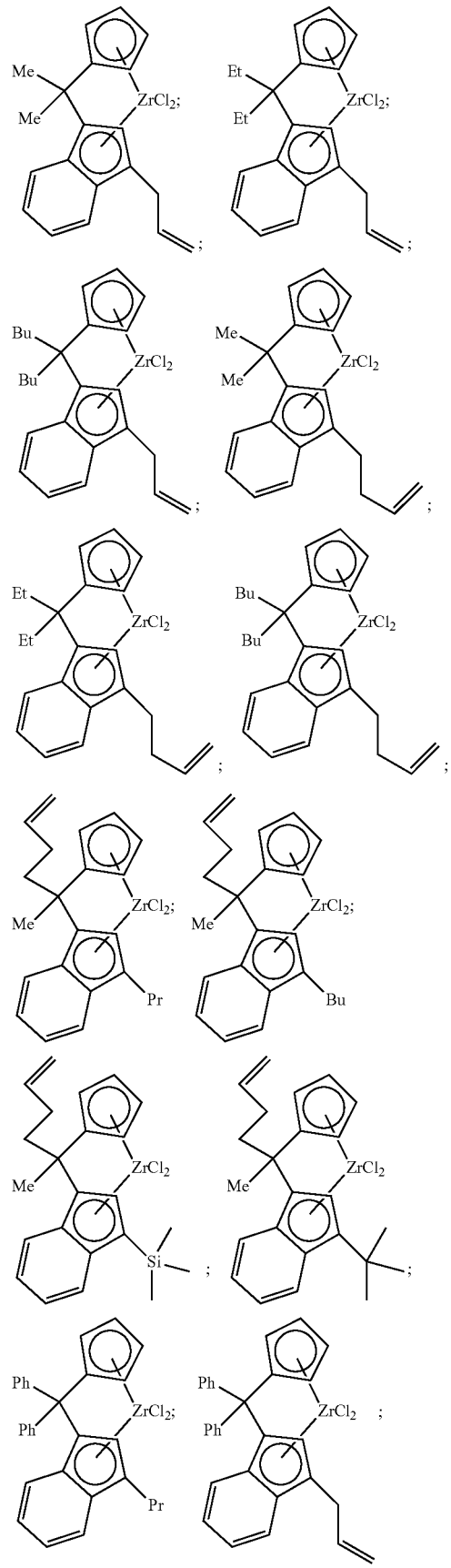

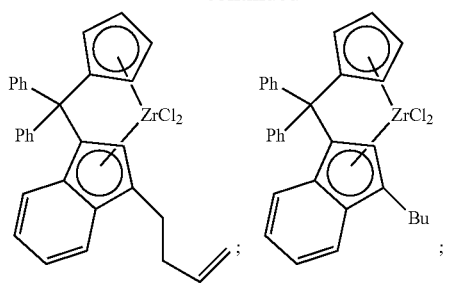
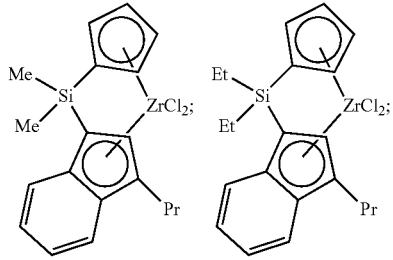
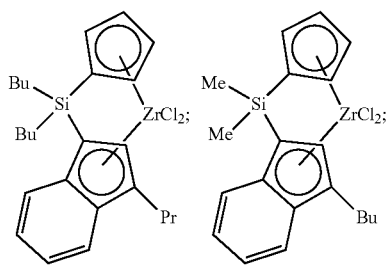
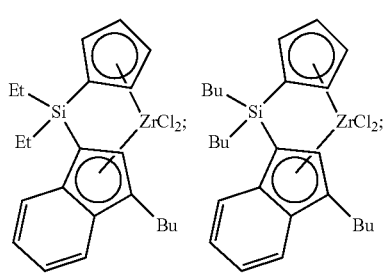
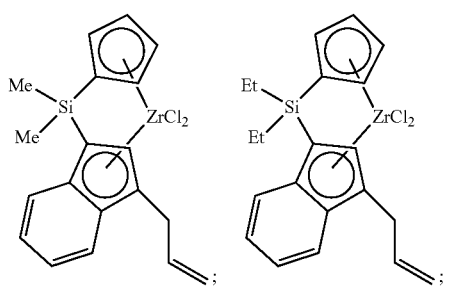
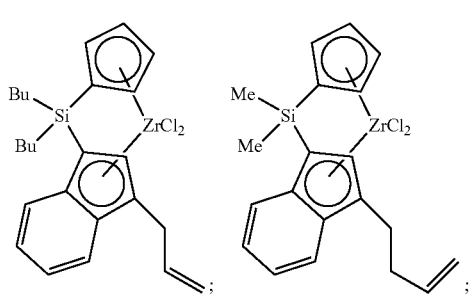

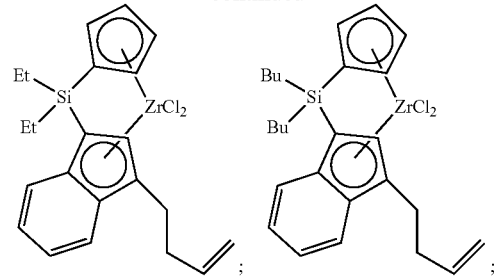
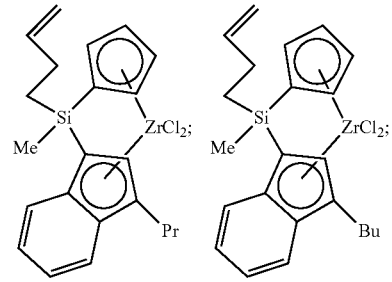
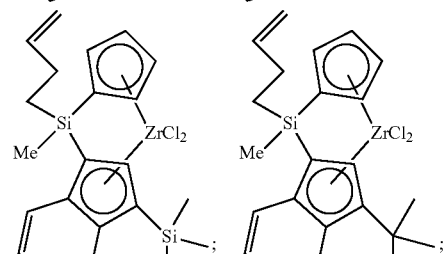
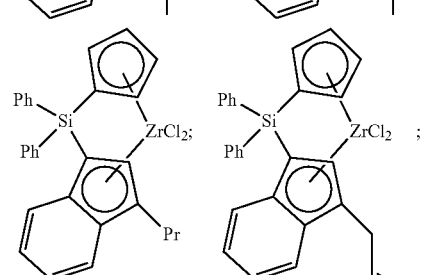
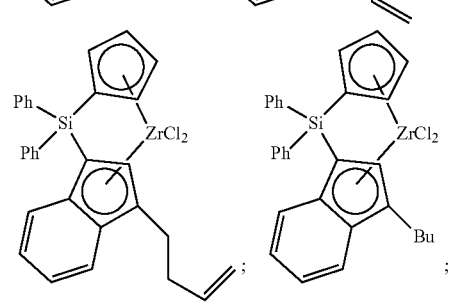

and the like, as well as combinations thereof.

Catalyst component II can comprise, in particular aspects of this invention, an unbridged hafnium metallocene compound with two cyclopentadienyl groups.

Independently, each cyclopentadienyl group can be substituted or unsubstituted. Thus, in one aspect, one of the two cyclopentadienyl groups can be substituted, while in another aspect, both cyclopentadienyl groups can be substituted.

If present, each substituent on the cyclopentadienyl group independently can be H, a halide, a $C_1$ to $C_{36}$ hydrocarbyl group, a $C_1$ to $C_{36}$ halogenated hydrocarbyl group, a $C_1$ to $C_{36}$ hydrocarboxy group, or a $C_1$ to $C_{36}$ hydrocarbylsilyl group. Importantly, each substituent on the cyclopentadienyl group(s) can be either the same or a different substituent group. Moreover, each substituent can be at any position on the cyclopentadienyl ring structure that conforms with the rules of chemical valence. In general, any substituent independently can be H or any halide, $C_1$ to $C_{36}$ hydrocarbyl group, $C_1$ to $C_{36}$ halogenated hydrocarbyl group, $C_1$ to $C_{36}$ hydrocarboxy group, or $C_1$ to $C_{36}$ hydrocarbylsilyl group described herein. In addition to representative substituents that are disclosed herein, additional suitable hydrocarbyl groups, halogenated hydrocarbyl groups, hydrocarboxy groups, and hydrocarbylsilyl groups are disclosed, for example, in U.S. Pat. No. 9,758,600, incorporated herein by reference in its entirety.

In one aspect, for example, each substituent independently can be a $C_1$ to $C_{12}$ hydrocarbyl group or a $C_1$ to $C_{12}$ hydrocarbylsilyl group. In another aspect, each substituent independently can be a $C_1$ to $C_8$ alkyl group or a $C_3$ to $C_8$ alkenyl group. In yet another aspect, each substituent independently can be H, Cl, $CF_3$, a methyl group, an ethyl group, a propyl group, a butyl group, a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a tolyl group, a benzyl group, a naphthyl group, a trimethylsilyl group, a triisopropylsilyl group, a triphenylsilyl group, or an allyldimethylsilyl group. In still another aspect, the cyclopentadienyl groups are the same or different, and are alkyl-substituted cyclopentadienyl groups, e.g., with a $C_1$ to $C_6$ alkyl substituent.

Non-limiting examples of unbridged metallocene compounds that are suitable for use as catalyst component II include, but are not limited to, the following:

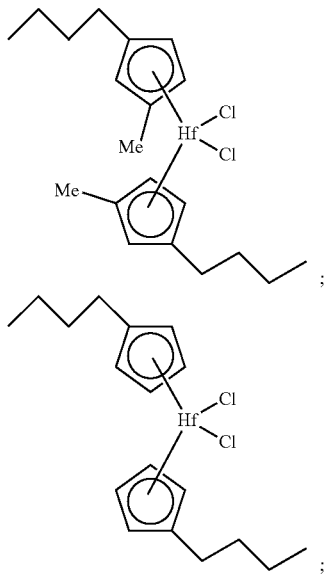

and the like, or combinations thereof.

According to an aspect of this invention, the weight ratio of catalyst component I to catalyst component II in the catalyst composition can be in a range from about 25:1 to about 1:25, from about 10:1 to about 1:10, from about 8:1 to about 1:8, from about 5:1 to about 1:5, from about 3:1 to about 1:3; from about 2:1 to about 1:2, from about 1.5:1 to about 1:1.5, from about 1.25:1 to about 1:1.25, or from about 1.1:1 to about 1:1.1. In another aspect, catalyst component I is the minor component of the catalyst composition, and in such aspects, the weight ratio of catalyst component I to catalyst component II in the catalyst composition can be in a range from about 1:1 to about 1:25, from about 1:1 to about 1:20, from about 1:2 to about 1:10, or from about 1:3 to about 1:15.

Additionally, the dual catalyst system contains an activator. For example, the catalyst system can contain an activator-support, an aluminoxane compound, an organoboron or organoborate compound, an ionizing ionic compound, and the like, or any combination thereof. The catalyst system can contain one or more than one activator.

In one aspect, the catalyst system can comprise an aluminoxane compound, an organoboron or organoborate compound, an ionizing ionic compound, and the like, or a combination thereof. Examples of such activators are disclosed in, for instance, U.S. Pat. Nos. 3,242,099, 4,794,096, 4,808,561, 5,576,259, 5,807,938, 5,919,983, and 8,114,946, the disclosures of which are incorporated herein by reference in their entirety.

In another aspect, the catalyst system can comprise an aluminoxane compound. In yet another aspect, the catalyst system can comprise an organoboron or organoborate compound. In still another aspect, the catalyst system can comprise an ionizing ionic compound.

In other aspects, the catalyst system can comprise an activator-support, for example, an activator-support comprising a solid oxide treated with an electron-withdrawing anion. Examples of such materials are disclosed in, for instance, U.S. Pat. Nos. 7,294,599, 7,601,665, 7,884,163, 8,309,485, 8,623,973, and 9,023,959, which are incorporated herein by reference in their entirety. For instance, the activator-support can comprise fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided-chlorided silica-coated alumina, fluorided silica-coated alumina, sulfated silica-coated alumina, or phosphated silica-coated alumina, and the like, as well as any combination thereof. In some aspects, the activator-support can comprise a fluorided solid oxide and/or a sulfated solid oxide.

Various processes can be used to form activator-supports useful in the present invention. Methods of contacting the solid oxide with the electron-withdrawing component, suitable electron withdrawing components and addition amounts, impregnation with metals or metal ions (e.g., zinc, nickel, vanadium, titanium, silver, copper, gallium, tin, tungsten, molybdenum, zirconium, and the like, or combinations thereof), and various calcining procedures and conditions are disclosed in, for example, U.S. Pat. Nos. 6,107,230, 6,165,929, 6,294,494, 6,300,271, 6,316,553, 6,355,594, 6,376,415, 6,388,017, 6,391,816, 6,395,666, 6,524,987, 6,548,441, 6,548,442, 6,576,583, 6,613,712, 6,632,894, 6,667,274, 6,750,302, 7,294,599, 7,601,665, 7,884,163, and 8,309,485, which are incorporated herein by reference in their entirety. Other suitable processes and procedures for preparing activator-supports (e.g., fluorided solid oxides, sulfated solid oxides, etc.) are well known to those of skill in the art.

The present invention can employ catalyst compositions containing catalyst component I, catalyst component II, an activator (one or more than one), and optionally, a co-catalyst. When present, the co-catalyst can include, but is not limited to, metal alkyl, or organometal, co-catalysts, with the metal encompassing boron, aluminum, zinc, and the like. Optionally, the catalyst systems provided herein can comprise a co-catalyst, or a combination of co-catalysts. For instance, alkyl boron, alkyl aluminum, and alkyl zinc compounds often can be used as co-catalysts in such catalyst systems. Representative boron compounds can include, but are not limited to, tri-n-butyl borane, tripropylborane, triethylborane, and the like, and this include combinations of two or more of these materials. While not being limited thereto, representative aluminum compounds (e.g., organoaluminum compounds) can include trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, and the like, as well as any combination thereof. Exemplary zinc compounds (e.g., organozinc compounds) that can be used as co-catalysts can include, but are not limited to, dimethylzinc, diethylzinc, dipropylzinc, dibutylzinc, dineopentylzinc, di(trimethylsilyl)zinc, di(triethylsilyl)zinc, di(triisoproplysilyl)zinc, di(triphenylsilyl)zinc, di(allyldimethylsilyl)zinc, di(trimethylsilylmethyl)zinc, and the like, or combinations thereof. Accordingly, in an aspect of this invention, the dual catalyst composition can comprise catalyst component I, catalyst component II, an activator-support, and an organoaluminum compound (and/or an organozinc compound).

In another aspect of the present invention, a catalyst composition is provided which comprises catalyst component I, catalyst component II, an activator-support, and an organoaluminum compound, wherein this catalyst composition is substantially free of aluminoxanes, organoboron or organoborate compounds, ionizing ionic compounds, and/or other similar materials; alternatively, substantially free of aluminoxanes; alternatively, substantially free or organoboron or organoborate compounds; or alternatively, substantially free of ionizing ionic compounds. In these aspects, the catalyst composition has catalyst activity, discussed herein, in the absence of these additional materials. For example, a catalyst composition of the present invention can consist essentially of catalyst component I, catalyst component II, an activator-support, and an organoaluminum compound, wherein no other materials are present in the catalyst composition which would increase/decrease the activity of the catalyst composition by more than about 10% from the catalyst activity of the catalyst composition in the absence of said materials.

Catalyst compositions of the present invention generally have a catalyst activity greater than about 250 grams of ethylene polymer (homopolymer and/or copolymer, as the context requires) per gram of activator-support per hour (abbreviated g/g/hr). In another aspect, the catalyst activity can be greater than about 350, greater than about 450, or greater than about 550 g/g/hr. Yet, in another aspect, the catalyst activity can be greater than about 700 g/g/hr, greater than about 1000 g/g/hr, or greater than about 2000 g/g/hr, and often as high as 3500-6000 g/g/hr. Illustrative and non-limiting ranges for the catalyst activity include from about 500 to about 5000, from about 750 to about 4000, or from about 1000 to about 3500 g/g/hr, and the like. These activities are measured under slurry polymerization conditions, with a triisobutylaluminum co-catalyst, using isobutane as the diluent, at a polymerization temperature of about 80° C. and a reactor pressure of about 350 psig. Moreover, in some aspects, the activator-support can comprise sulfated alumina, fluorided silica-alumina, or fluorided silica-coated alumina, although not limited thereto.

This invention further encompasses methods of making these catalyst compositions, such as, for example, contacting the respective catalyst components in any order or sequence. In one aspect, for example, the catalyst composition can be produced by a process comprising contacting, in any order, catalyst component I, catalyst component II, and the activator, while in another aspect, the catalyst composition can be produced by a process comprising contacting, in any order, catalyst component I, catalyst component II, the activator, and the co-catalyst.

Olefin polymers (e.g., ethylene polymers) can be produced from the disclosed catalyst systems using any suitable olefin polymerization process using various types of polymerization reactors, polymerization reactor systems, and polymerization reaction conditions. One such olefin polymerization process for polymerizing olefins in the presence of a catalyst composition of the present invention can comprise contacting the catalyst composition with an olefin monomer and optionally an olefin comonomer (one or more) in a polymerization reactor system under polymerization conditions to produce an olefin polymer, wherein the catalyst composition can comprise, as disclosed herein, catalyst component I, catalyst component II, an activator, and an optional co-catalyst. This invention also encompasses any olefin polymers (e.g., ethylene polymers) produced by any of the polymerization processes disclosed herein.

As used herein, a "polymerization reactor" includes any polymerization reactor capable of polymerizing (inclusive of oligomerizing) olefin monomers and comonomers (one or more than one comonomer) to produce homopolymers, copolymers, terpolymers, and the like. The various types of polymerization reactors include those that can be referred to as a batch reactor, slurry reactor, gas-phase reactor, solution reactor, high pressure reactor, tubular reactor, autoclave reactor, and the like, or combinations thereof; or alternatively, the polymerization reactor system can comprise a slurry reactor, a gas-phase reactor, a solution reactor, or a combination thereof. The polymerization conditions for the various reactor types are well known to those of skill in the art. Gas phase reactors can comprise fluidized bed reactors or staged horizontal reactors. Slurry reactors can comprise vertical or horizontal loops. High pressure reactors can comprise autoclave or tubular reactors. Reactor types can include batch or continuous processes. Continuous processes can use intermittent or continuous product discharge. Polymerization reactor systems and processes also can include partial or full direct recycle of unreacted monomer, unreacted comonomer, and/or diluent.

A polymerization reactor system can comprise a single reactor or multiple reactors (2 reactors, more than 2 reactors, etc.) of the same or different type. For instance, the polymerization reactor system can comprise a slurry reactor, a gas-phase reactor, a solution reactor, or a combination of two or more of these reactors. Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both. Accordingly, the present invention encompasses polymerization reactor systems comprising a single reactor, comprising two reactors, and comprising more than two reactors. The polymerization reactor system can comprise a slurry reactor, a gas-phase reactor, a solution reactor, in certain aspects of this invention, as well as multi-reactor combinations thereof.

According to one aspect, the polymerization reactor system can comprise at least one loop slurry reactor comprising vertical or horizontal loops. Monomer, diluent, catalyst, and comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, 6,833,415, and 8,822,608, each of which is incorporated herein by reference in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used.

According to yet another aspect, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. Representative gas phase reactors are disclosed in U.S. Pat. Nos. 5,352,749, 4,588,790, 5,436,304, 7,531,606, and 7,598,327, each of which is incorporated by reference in its entirety herein.

According to still another aspect, the polymerization reactor system can comprise a high pressure polymerization reactor, e.g., can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another aspect, the polymerization reactor system can comprise a solution polymerization reactor wherein the monomer/comonomer are contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone can be maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

The polymerization reactor system can further comprise any combination of at least one raw material feed system, at least one feed system for catalyst or catalyst components, and/or at least one polymer recovery system. Suitable reactor systems can further comprise systems for feedstock purification, catalyst storage and preparation, extrusion, reactor cooling, polymer recovery, fractionation, recycle, storage, loadout, laboratory analysis, and process control. Depending upon the desired properties of the olefin polymer, hydrogen can be added to the polymerization reactor as needed (e.g., continuously, pulsed, etc.).

Polymerization conditions that can be controlled for efficiency and to provide desired polymer properties can include temperature, pressure, and the concentrations of various reactants. Polymerization temperature can affect catalyst productivity, polymer molecular weight, and molecular weight distribution. Various polymerization conditions can be held substantially constant, for example, for the production of a particular grade of the olefin polymer (or ethylene polymer). A suitable polymerization temperature can be any temperature below the de-polymerization temperature according to the Gibbs Free energy equation. Typically, this includes from about 60° C. to about 280° C., for example, or from about 60° C. to about 120° C., depending upon the type of polymerization reactor(s). In some reactor systems, the polymerization temperature generally can be within a range from about 70° C. to about 100° C., or from about 75° C. to about 95° C.

Suitable pressures will also vary according to the reactor and polymerization type. The pressure for liquid phase polymerizations in a loop reactor is typically less than 1000 psig (6.9 MPa). Pressure for gas phase polymerization is usually at about 200 to 500 psig (1.4 MPa to 3.4 MPa). High pressure polymerization in tubular or autoclave reactors is generally run at about 20,000 to 75,000 psig (138 to 517 MPa). Polymerization reactors can also be operated in a supercritical region occurring at generally higher temperatures and pressures. Operation above the critical point of a pressure/temperature diagram (supercritical phase) can offer advantages to the polymerization reaction process.

Olefin monomers that can be employed with catalyst compositions and polymerization processes of this invention typically can include olefin compounds having from 2 to 30 carbon atoms per molecule and having at least one olefinic double bond, such as ethylene or propylene. In an aspect, the olefin monomer can comprise a $C_2$-$C_{20}$ olefin; alternatively, a $C_2$-$C_{20}$ alpha-olefin; alternatively, a $C_2$-$C_{10}$ olefin; alternatively, a $C_2$-$C_{10}$ alpha-olefin; alternatively, the olefin monomer can comprise ethylene; or alternatively, the olefin monomer can comprise propylene (e.g., to produce a polypropylene homopolymer or a propylene-based copolymer).

When a copolymer (or alternatively, a terpolymer) is desired, the olefin monomer and the olefin comonomer independently can comprise, for example, a $C_2$-$C_{20}$ alpha-olefin. In some aspects, the olefin monomer can comprise ethylene or propylene, which is copolymerized with at least one comonomer (e.g., a $C_2$-$C_{20}$ alpha-olefin, a $C_3$-$C_{20}$ alpha-olefin, etc.). According to one aspect of this invention, the olefin monomer used in the polymerization process can comprise ethylene. In this aspect, the comonomer can comprise a $C_3$-$C_{10}$ alpha-olefin; alternatively, the comonomer can comprise 1-butene, 1-pentene, 1-hexene, 1-octene, 1-decene, styrene, or any combination thereof, alternatively, the comonomer can comprise 1-butene, 1-hexene, 1-octene, or any combination thereof, alternatively, the comonomer can comprise 1-butene; alternatively, the comonomer can comprise 1-hexene; or alternatively, the comonomer can comprise 1-octene.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

Melt index (MI, g/10 min) was determined in accordance with ASTM D1238 at 190° C. with a 2,160 gram weight, and high load melt index (HLMI, g/10 min) was determined in accordance with ASTM D1238 at 190° C. with a 21,600 gram weight. Density was determined in grams per cubic centimeter (g/cm$^3$) on a compression molded sample, cooled at 15° C. per hour, and conditioned for 40 hours at room temperature in accordance with ASTM D1505 and ASTM D4703.

Molecular weights and molecular weight distributions were obtained using a PL-GPC 220 (Polymer Labs, an Agilent Company) system equipped with a IR4 detector (Polymer Char, Spain) and three Styragel HMW-6E GPC columns (Waters, MA) running at 145° C. The flow rate of the mobile phase 1,2,4-trichlorobenzene (TCB) containing 0.5 g/L 2,6-di-t-butyl-4-methylphenol (BHT) was set at 1 mL/min, and polymer solution concentrations were in the range of 1.0-1.5 mg/mL, depending on the molecular weight. Sample preparation was conducted at 150° C. for nominally 4 hr with occasional and gentle agitation, before the solutions were transferred to sample vials for injection. An injection volume of about 400 µL was used. The integral calibration method was used to deduce molecular weights and molecular weight distributions using a Chevron Phillips Chemical Company's HDPE polyethylene resin, MARLEX® BHB5003, as the standard. The integral table of the standard was pre-determined in a separate experiment with SEC-MALS. Mn is the number-average molecular weight, Mw is the weight-average molecular weight, Mz is the z-average molecular weight, and Mp is the peak molecular weight (location, in molecular weight, of the highest point of the molecular weight distribution curve). The IB parameter was determined from the molecular weight distribution curve (plot of dW/d(Log M) vs. Log M; normalized to an area equal to 1), and is defined as 1/[dW/d(Log M)]$_{MAX}$.

Melt rheological characterizations were performed as follows. Small-strain (less than 10%) oscillatory shear measurements were performed on an Anton Paar MCR rheometer using parallel-plate geometry. All rheological tests were performed at 190° C. The complex viscosity |η*| versus frequency (c) data were then curve fitted using the modified three parameter Carreau-Yasuda (CY) empirical model to obtain the zero shear viscosity—η$_0$, characteristic viscous relaxation time—τ$_η$, and the breadth parameter—a (CY-a parameter). The simplified Carreau-Yasuda (CY) empirical model is as follows.

$$|\eta^*(\omega)| = \frac{\eta_0}{[1 + (\tau_\eta \omega)^a]^{(1-n)/a}},$$

wherein: |η*(ω)|=magnitude of complex shear viscosity;
η$_0$=zero shear viscosity;
τ$_η$=viscous relaxation time (Tau(η));
a="breadth" parameter (CY-a parameter);
n=fixes the final power law slope, fixed at 2/11; and
ω=angular frequency of oscillatory shearing deformation.

Details of the significance and interpretation of the CY model and derived parameters can be found in: C. A. Hieber and H. H. Chiang, *Rheol. Acra*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume 1, Fluid Mechanics*, 2nd Edition, John Wiley & Sons (1987); each of which is incorporated herein by reference in its entirety.

The ATREF procedure was as follows. Forty mg of the polymer sample and 20 mL of 1,2,4-trichlorobenzene (TCB) were sequentially charged into a vessel on a PolyChar TREF 200+instrument. After dissolving the polymer, an aliquot (500 microliters) of the polymer solution was loaded on the column (stainless steel shots) at 150° C. and cooled at 0.5° C./min to 25° C. Then, the elution was begun with a 0.5 mL/min TCB flow rate and heating at 1° C./min up to 120° C., and analyzing with an IR detector. The peak ATREF temperature is the location, in temperature, of the highest point of the ATREF curve.

The long chain branches (LCBs) per 1,000,000 total carbon atoms of the overall polymer were calculated using the method of Janzen and Colby (*J. Mol. Struct.*, 485/486, 569-584 (1999), incorporated herein by reference in its entirety), from values of zero shear viscosity, η$_o$ (determined from the Carreau-Yasuda model, described hereinabove), and measured values of Mw obtained using a Dawn EOS multiangle light scattering detector (Wyatt).

LCB content in the high molecular weight fraction and LCB distribution were determined using the method established by Yu, et al (Yu, DesLauriers, Rohlfing, Polymer, 2015, 46, 5165-5192, incorporated herein by reference in its entirety). Briefly, in the SEC-MALS system, a DAWN EOS photometer (Wyatt Technology, Santa Barbara, CA) was attached to a Waters 150-CV plus GPC system (Milford, MA) or a PL-210 GPC system (Polymer Labs, an Agilent company) through a hot-transfer line controlled at 145° C. Degassed mobile phase 1,2,4-trichlorobenzene (TCB) containing 0.5 wt % of BHT (butylated hydroxytoluene) was pumped through an inline filter before passing through a SEC column bank. Polymer solutions injected to the system were brought downstream to the columns by the mobile phase for fractionation. The fractionated polymers first eluted through the MALS photometer where light scattering signals were recorded before passing through the differential refractive index detector (DRI) or an IR4 detector (Polymer Characterization SA, Spain) where their concentrations were quantified.

The DAWN EOS system was calibrated with neat toluene at room temperature to convert the measured voltage to intensity of scattered light. During the calibration, toluene was filtered with a 0.02 μm filter (Whatman) and directly passed through the flowcell of the EOS system. At room temperature, the Rayleigh ratio is given by $1.406 \times 10^{-5}$ cm$^{-1}$. A narrow polystyrene (PS) standard (American Polymer Standards) with MW of 30,000 g/mol at a concentration about 5-10 mg/mL in TCB was employed to normalize the system at 145° C. At the given chromatographic conditions, the radius of gyration ($R_g$) of the polystyrene (PS) was estimated to be 5.6 nm. The differential refractive index detector (DRI) was calibrated with a known quantity of PE standard. By averaging the total chromatographic areas of recorded chromatograms for at least five injections, the DRI constant ($\alpha_{RI}$) was obtained using the equation below (equation 1):

$$\alpha_{RI} = \left(\frac{dn}{dc}\right) c / I_{RI} \quad \text{Equation 1}$$

where $I_{RI}$ is the DRI detector intensity, c is the polymer concentration, and dn/dc is the refractive index increment of PE in TCB at the measuring temperature.

At a flow rate set at 0.7 mL/min, the mobile phase was eluted through three (3) 7.5 mm×300 mm 20 μm mixed A columns (Polymer Labs, an Agilent company). PE solutions with nominal concentrations of 1.5 mg/mL were prepared at 150° C. for 4 h. At each chromatographic slice, both the absolute molecular weight (M) and the root mean square (RMS) radius, aka, radius of gyration, $R_g$, were obtained from the Debye plots. The linear PE control employed was CPChem Marlex™ HiD9640, a high-density PE with broad MWD. The refractive index increment dn/dc used in this study was 0.097 mL/g for PE dissolved in TCB at 135° C.

The Zimm-Stockmayer approach (Zimm, Stockmayer, J Chem. Phys. 1949, 17, 1301, incorporated herein by reference in its entirety) was employed to determine the amount of LCB in the polyethylene resins. In SEC-MALS, both M and $R_g$ were measured simultaneously at each slice of a chromatogram. At the same molecular weight, $R_g$ of a branched polymer is smaller than that of a linear polymer. The branching index ($g_M$) factor is defined as the ratio of the mean square radius of gyration of the branched polymer to that of the linear one at the same molecular weight using equation 2, $$g_M \equiv \frac{\langle R_g^2 \rangle_b}{\langle R_g^2 \rangle_l}\bigg|_M \quad \text{Equation 2}$$

where the subscripts b and l represent the branched and linear polymer, respectively.

The weight-average LCB per molecule ($B_{3w}$) was calculated using Equation 3 using an in-house software, $$g_M = \frac{6}{B_{3w}}\left\{\frac{1}{2}\left(\frac{2+B_{3w}}{B_{3w}}\right)^{1/2} \ln\left[\frac{(2+B_{3w})^{1/2}+(B_{3w})^{1/2}}{(2+B_{3w})^{1/2}-(B_{3w})^{1/2}}\right] - 1\right\} \quad (3)$$

LCB frequency ($\lambda_{M_i}$, number of LCB per 1,000 total carbons) was calculated using equation 4 using the $B_{3w}$ value obtained from equation 3, $$\lambda_{M_i} = 1,000 \times M_0 \times B_{3w}/M_i \quad (4)$$

where $M_0$ is the unit molecular weight of polyethylene, $M_i$ is the molecular weight of the $i^{th}$ slice.

Since the presence of SCB in a polymer can affect its $R_g$-MW relationship, the SCB effect was corrected before using equation 3 and 4 for LCB and LCB distribution calculation for PE copolymers. To correct the SCB effect on the branching index across the MWD, two relationships are needed: one is the relationship between the branching-index correction factor ($\Delta g_M$) and the SCB content ($x_{SCB}$), and the other is the relationship between SCB content and molecular weight, both of which were determined experimentally. Mathematically, the product of these two relationships gives the branching index correction factor ($\Delta g_M$) as a function of MW, as shown in equation 5, $$\frac{d(\Delta g_M)}{d(M)} = \frac{d(x_{SCB})}{d(M)} \times \frac{d(\Delta g_M)}{d(x_{SCB})} \quad (5)$$

where $x_{SCB}$ is the SCB content (i.e., number of SCB per 1,000 total carbons) of the copolymer in question.

To establish the relationship between $\Delta g_M$ and $x_{SCB}$, PE standards that met the following criteria were used: the standards contain essentially no LCB and have flat SCB distribution and known SCB contents. At least five SCB standards were used for the SCB effect correction. The SCB content for these SCB standards ranged from 0 to 34 SCB/1,000 total carbon atoms.

Short chain branch content and short chain branching distribution (SCBD) across the molecular weight distribution were determined via an IR5-detected GPC system (IR5-GPC), wherein the GPC system was a PL220 GPC/SEC system (Polymer Labs, an Agilent company) equipped with three Styragel HMW-6E columns (Waters, MA) for polymer separation. A thermoelectric-cooled IR5 MCT detector (IR5) (Polymer Char, Spain) was connected to the GPC columns via a hot-transfer line. Chromatographic data was obtained from two output ports of the IR5 detector. First, the analog signal goes from the analog output port to a digitizer before connecting to Computer "A" for molecular weight determinations via the Cirrus software (Polymer Labs, now an Agilent Company) and the integral calibration method using a HDPE Marlex™ BHB5003 resin (Chevron Phillips Chemical) as the molecular weight standard. The digital signals, on the other hand, go via a USB cable directly to Computer "B" where they are collected by a LabView data collection software provided by Polymer Char. Chromatographic conditions were set as follows: column oven temperature of 145° C.; flowrate of 1 mL/min; injection volume of 0.4 mL; and polymer concentration of about 2 mg/mL, depending on sample molecular weight. The temperatures for both the hot-transfer line and IR5 detector sample cell were set at 150° C., while the temperature of the electronics of the IR5 detector was set at 60° C. Short chain branching content was determined via an in-house method using the intensity ratio of $CH_3$ ($I_{CH3}$) to $CH_2$ ($I_{CH2}$) coupled with a calibration curve. The calibration curve was a plot of SCB content ($x_{SCB}$) as a function of the intensity ratio of $I_{CH3}/I_{CH2}$. To obtain a calibration curve, a group of polyethylene resins (no less than 5) of SCB level ranging from zero to ca. 32 SCB/1,000 total carbons (SCB Standards) were used. All these SCB Standards have known SCB levels and flat SCBD profiles pre-determined separately by NMR and the solvent-gradient fractionation coupled with NMR (SGF-NMR) methods. Using SCB calibration curves thus established, profiles of short chain branching distribution across the molecular weight distribution were obtained for resins fractionated by the IR5-GPC system under exactly the same chromatographic conditions as for these SCB standards. A relationship between the intensity ratio and the elution volume was converted into SCB distribution as a function of MWD using a predetermined SCB calibration curve (i.e., intensity ratio of $I_{CH3}/I_{CH2}$ vs. SCB content) and MW calibration curve (i.e., molecular weight vs. elution time) to convert the intensity ratio of $I_{CH3}/I_{CH2}$ and the elution time into SCB content and the molecular weight, respectively.

Extensional viscosity was measured on a rotational rheometer (Physica MCR-500, Anton Paar) using the extensional viscosity fixture, a Sentimanat Extensional Rheometer (model SER-3 universal testing platform, Xpansion Instruments). The SER attachment makes it possible to easily measure the transient extensional viscosity as a function of time.

Test samples were prepared via compression molding at 182° C. The pellets samples were allowed to melt at a relatively low pressure for 1 min and then subjected to a high molding pressure for additional 2 min. Then, the hot press was turned off for slow cooling. The cooled plaque was retrieved from the press on the following day. Rectangular strips with dimensions of 12.77×18 mm were cut out of the molded plaque, and the thickness of the sample was measured.

The SER testing platform has two drums that rotate in the opposing direction (M. L. Sentmanat, "Miniature universal testing platform: from extensional melt rheology to solid-state deformation behavior," *Rheol. Acta* 43, 657 (2004); M. L. Sentmanat, B. N. Wang, G. H. McKinley, "Measuring the transient extensional rheology of polyethylene melts using the SER universal testing platform," *J. Rheol.* 49, 585 (2005); both incorporated herein by reference in their entirety). The rectangular samples were tested by clipping onto the two posts of the fixture, then closing the oven to heat to 150° C., where it was annealed at 150° C. for 30 sec to allow the temperature to reach equilibrium. The sample was then stretched at constant Hencky strain rates $\dot{\varepsilon}_H$ between 0.03 and 25 s$^{-1}$ at 150° C. The torque M resulting from the force of tangential stretching of the sample between the rotating drums F was recorded by the rotational rheometer:

$$M(t) = 2RF(t) \qquad (A)$$

where the radius of drums R=5.155 mm. The Hencky strain rate $\dot{\varepsilon}_H$ at constant drum rotating speed $\Omega$ is $$\dot{\varepsilon}_H = \frac{2\Omega R}{L} \qquad (B)$$

where the length of the stretching zone between the rotating drums L=12.72 mm. The transient extensional viscosity $\eta_E^+(t)$ was obtained for given Hencky strain rate as $$\eta_E^+(t) = \frac{\sigma_E(t)}{\dot{\varepsilon}_E} = \frac{F(t)}{A(t,T)\dot{\varepsilon}_E} \qquad (C)$$

where A(t,T) is the cross-sectional area of the sample which thermally expands upon melting and exponentially decreases with stretching:

$$A(t, T) = A_o \exp(-\dot{\varepsilon}_E t)\left(\frac{\rho_s}{\rho(T)}\right)^{2/3} \qquad (D)$$

where $A_0$ and $\rho_s$ are the initial cross-sectional area and the density of the sample measured at room temperature in solid state. The melt density $\rho(T)$ is given by $\rho(T)=\rho_0-\Delta\rho(T-273.15)T$. Therefore, the transient extensional viscosity $\eta_E^+(t)$ as a function of time was calculated at each extension rate as $$\eta_E^+(t) = \frac{M - M_{offset}}{2R\dot{\varepsilon}_E A_0 \exp(-\dot{\varepsilon}_E t)}\left(\frac{\rho(T)}{\rho_s}\right)^{2/3} \qquad (E)$$

where $M_{offset}$ is a pre-set torque which can be applied prior to the actual test. To compare the extensional response to the linear viscoelastic (LVE) limit, the LVE envelop $3\eta^+(t)$ was obtained from the relaxation spectrum of the dynamic frequency sweep data measured at 150° C. as $$\eta^+(t) = \sum_{i=1}^{N} G_i \lambda_i [1 - \exp(-t/\lambda_i)] \qquad (F)$$

where the set of G, and A, define the relaxation spectrum of the material.

In general, it has been observed that when long chain branching exists in the polymer, the transient extensional viscosity deviates from the LVE drastically by increasing slope just before breakage. This behavior is called the strain hardening. In contrast, for linear resins the transient extensional viscosity growth curves show no strain hardening by continuing to follow the LVE envelop ($3\eta^+(t)$) according to the Trouton's rule.

Machine direction (MD) and transverse direction (TD) Elmendorf tear strengths (g/mil) were measured on a Testing Machines Inc. tear tester (Model 83-11-00) in accordance with ASTM D1922. Film haze (%) was determined in accordance with ASTM D1003.

Metals content, such as the amount of catalyst residue in the ethylene polymer or film (on a ppm basis), can be determined by ICP analysis on a PerkinElmer Optima 8300 instrument. Polymer samples can be ashed in a Thermolyne furnace with sulfuric acid overnight, followed by acid digestion in a HotBlock with HCl and HNO$_3$ (3:1 v:v).

Fluorided silica-coated alumina activator-supports (FSCA) were prepared as follows. Bohemite was obtained from W.R. Grace & Company under the designation "Alumina A" and having a surface area of 300 m$^2$/g, a pore volume of 1.3 mL/g, and an average particle size of 100 microns. The alumina was first calcined in dry air at about 600° C. for approximately 6 hours, cooled to ambient temperature, and then contacted with tetraethylorthosilicate in isopropanol to equal 25 wt. % SiO$_2$. After drying, the silica-coated alumina was calcined at 600° C. for 3 hours. Fluorided silica-coated alumina (7 wt. % F) was prepared by impregnating the calcined silica-coated alumina with an ammonium bifluoride solution in methanol, drying, and then calcining for 3 hours at 600° C. in dry air. Afterward, the fluorided silica-coated alumina (FSCA) was collected and stored under dry nitrogen, and was used without exposure to the atmosphere.

Examples 1-12

Comparative Example 11 was a commercially-available metallocene-catalyzed medium density ethylene copolymer resin from Chevron-Phillips Chemical Company LP, and Comparative Example 12 was a commercially-available chromium-catalyzed medium density ethylene copolymer resin from Chevron-Phillips Chemical Company LP.

The polymerization experiments of Examples 1-10 were conducted for 30-60 min in a one-gallon or five-gallon stainless-steel autoclave reactor containing isobutane as diluent, and hydrogen added from a 325-cc auxiliary vessel. Table I summarizes certain polymerization conditions for Examples 1-10. Generally, solutions of the metallocene compounds were prepared by dissolving approximately 20 mg total of the catalyst component I and catalyst component II metallocenes in 20 mL of toluene. Under an isobutane purge, TIBA (1M in heptanes), the FSCA, and the metallocene solutions were charged in that order to a cold reactor through a charge port. The reactor was closed, and isobutane was added. The reactor was heated to the desired run temperature of 80° C., and 1-hexene and ethylene were then introduced into the reactor (hydrogen was not used). Ethylene was fed on demand to maintain the target pressure of 320 or 350 psig.

The reactor was maintained at the desired temperature throughout the experiment by an automated heating-cooling system. After venting of the reactor, purging, and cooling, the resulting polymer product was dried at 50° C. under reduced pressure. The structures for the metallocene compounds used in Examples 1-10 are shown below (Et=ethyl; Pr=propyl):

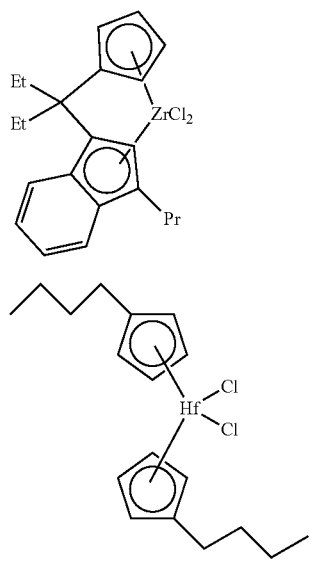

MET-1

MET-2

Cast film samples at a 1-mil thickness (25 microns) were produced from the polymers of Examples 8-10 on a laboratory-scale cast film line using typical linear low density polyethylene conditions (LLDPE) as follows: 152 mm die width, 0.508 mm die gap, 16 mm diameter single-screw extruder (L/D=24-27), 0.5 kg/hr output rate, and 204° C. barrel and die set temperatures. Cooling was accomplished with chill roll at about 23° C. These particular processing conditions were chosen because the cast film properties so obtained are typically representative of those obtained from larger, commercial scale film casting conditions.

Blown film samples at a 1-mil thickness (25 microns) were produced from the polymer of Example 11 on a laboratory-scale blown film line using typical linear low density polyethylene conditions (LLDPE) as follows: 100 mm die diameter, 1.5 mm die gap, 37.5 mm diameter single-screw extruder fitted with a barrier screw with a Maddock mixing section at the end (L/D=24, 2.2:1 compression ratio), 27 kg/hr output rate, 2.5:1 blow-up ratio (BUR), "in-pocket" bubble with a "frost line height" (FLH) of about 28 cm, and 190° C. barrel and die set temperatures. Cooling was accomplished with a Dual Lip air ring using ambient (laboratory) air at about 25° C. These particular processing conditions were chosen because the blown film properties so obtained are typically representative of those obtained from larger, commercial scale film blowing conditions.

Figure 2:
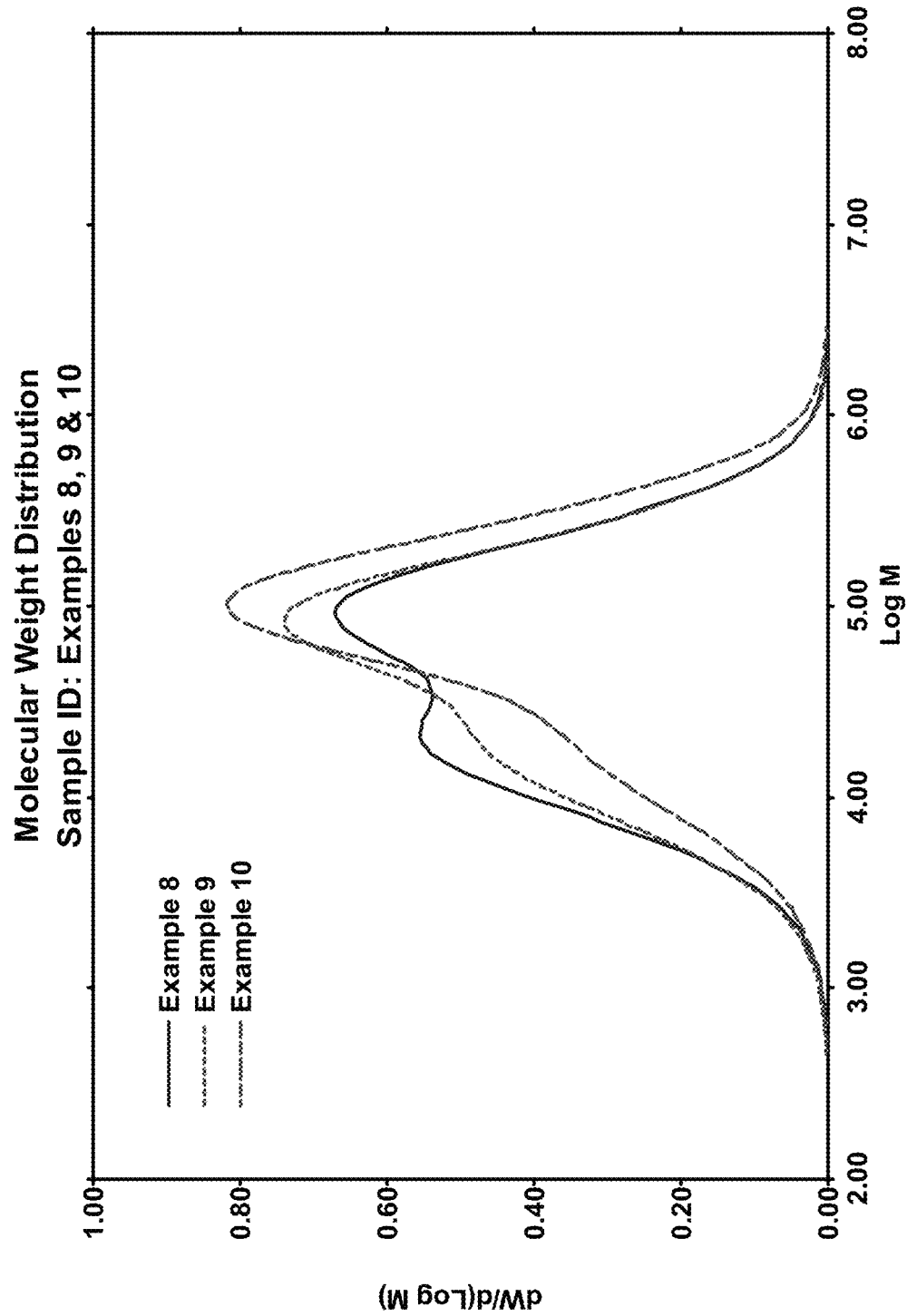
FIG. 2 presents a plot of the molecular weight distributions of the polymers of Examples 8-10.

For the polymers of Examples 1-12, Table II summarizes various melt index, density, rheology, and LCB (Janzen-Colby) properties, while Table III summarizes molecular weight properties. FIG. 1 illustrates the molecular weight distribution curves (amount of polymer versus the logarithm of molecular weight) for the polymers of Examples 1, 3, and 11-12, while FIG. 2 illustrates the molecular weight distribution curves for the polymers of Examples 8-10. Generally, the polymers of Examples 1-10 had densities in the 0.92-0.94 g/cm$^3$ range, melt index values in the 0-10 g/10 min range, ratios of Mw/Mn in the 3-6 range, ratios of Mz/Mw in the 2-4 range, CY-a parameters in the 0.3-0.6 range, low relaxation times of less than 0.1 sec, and overall LCB contents (Janzen-Colby) in the 1-7 LCB range (per 1,000,000 carbon atoms).

Figure 3:
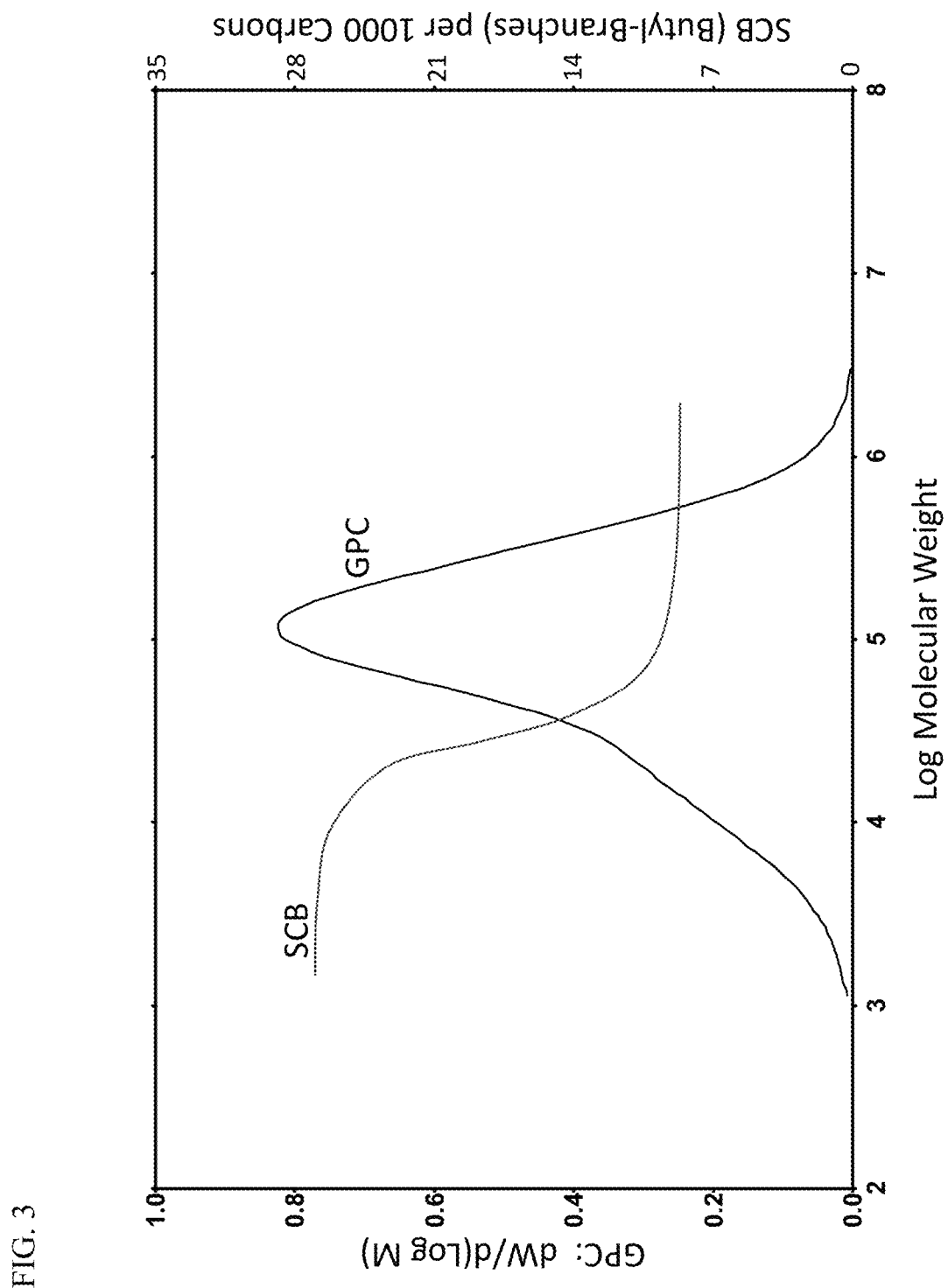
FIG. 3 presents a plot of the short chain branch distribution across the molecular weight distribution of the polymer of Example 2.
Figure 4:
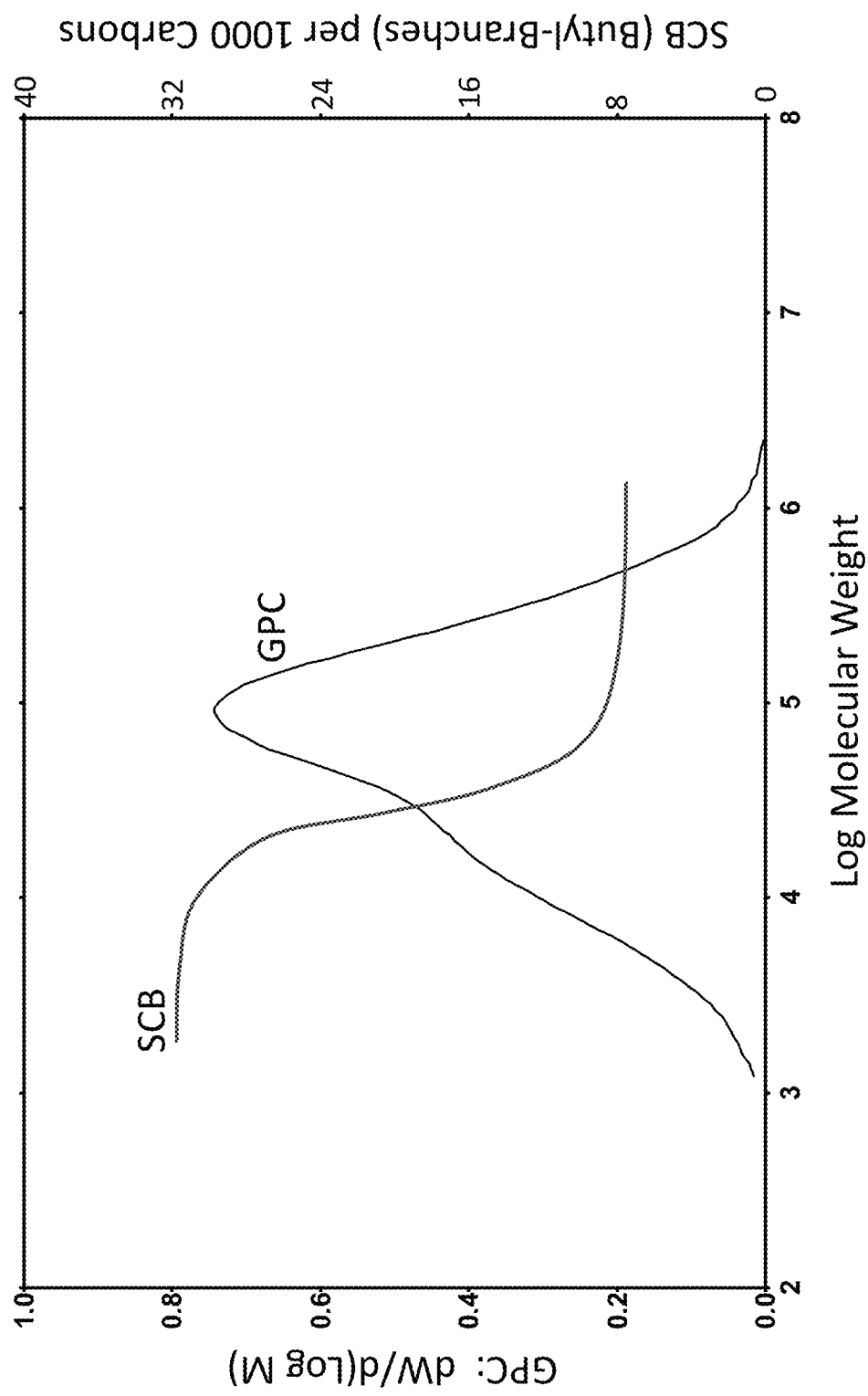
FIG. 4 presents a plot of the short chain branch distribution across the molecular weight distribution of the polymer of Example 3.
Figure 5:
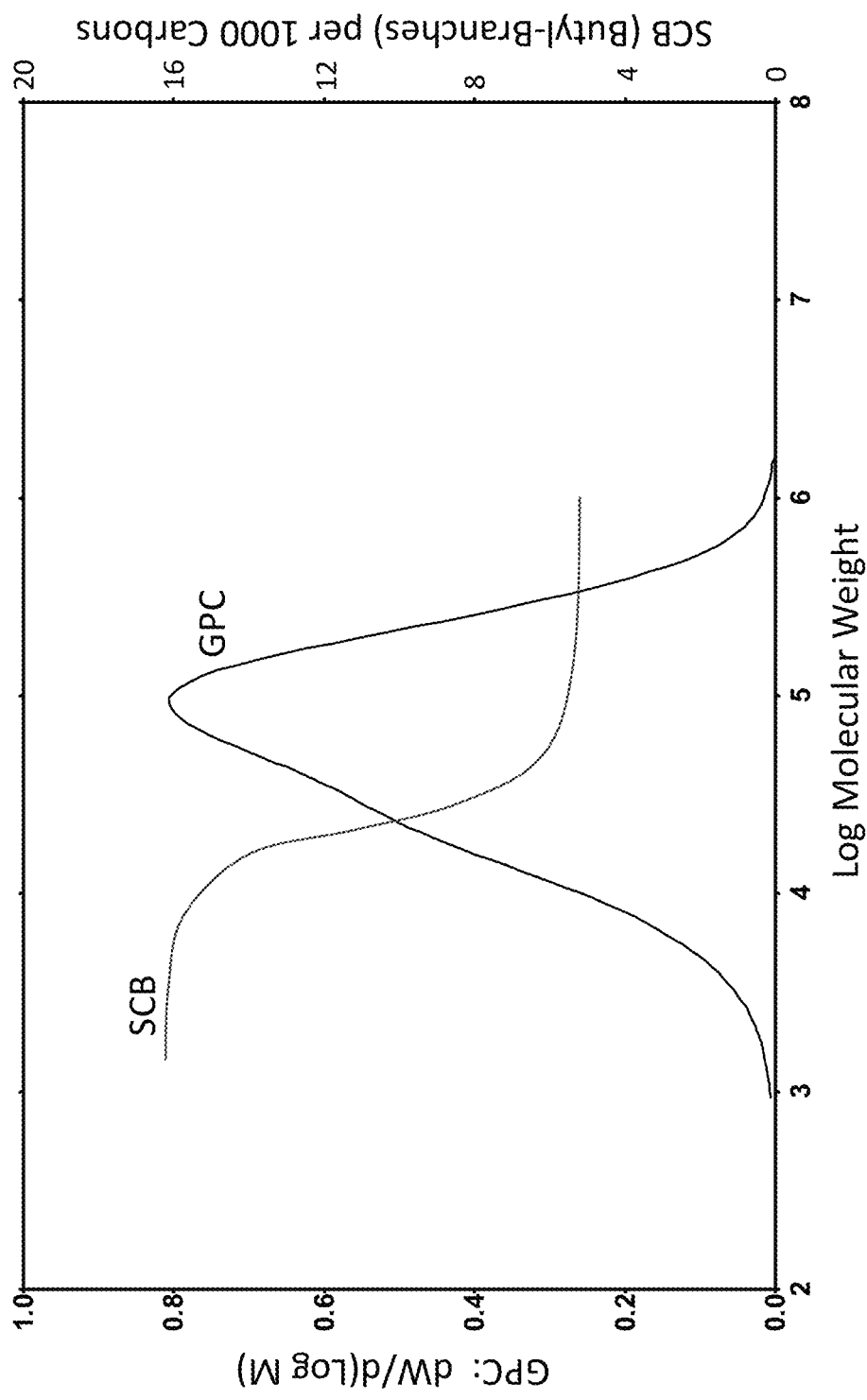
FIG. 5 presents a plot of the short chain branch distribution across the molecular weight distribution of the polymer of Example 5.

FIGS. 3-5 illustrate the short chain branch distributions for the polymers of Examples 2, 3, and 5, respectively, and these curves are representative of the other ethylene polymers produced in the inventive examples. Surprisingly, these polymers have a conventional SCBD (e.g., similar to chromium-based polymers), in which the SCB content generally decreases with increasing molecular weight.

Figure 6:
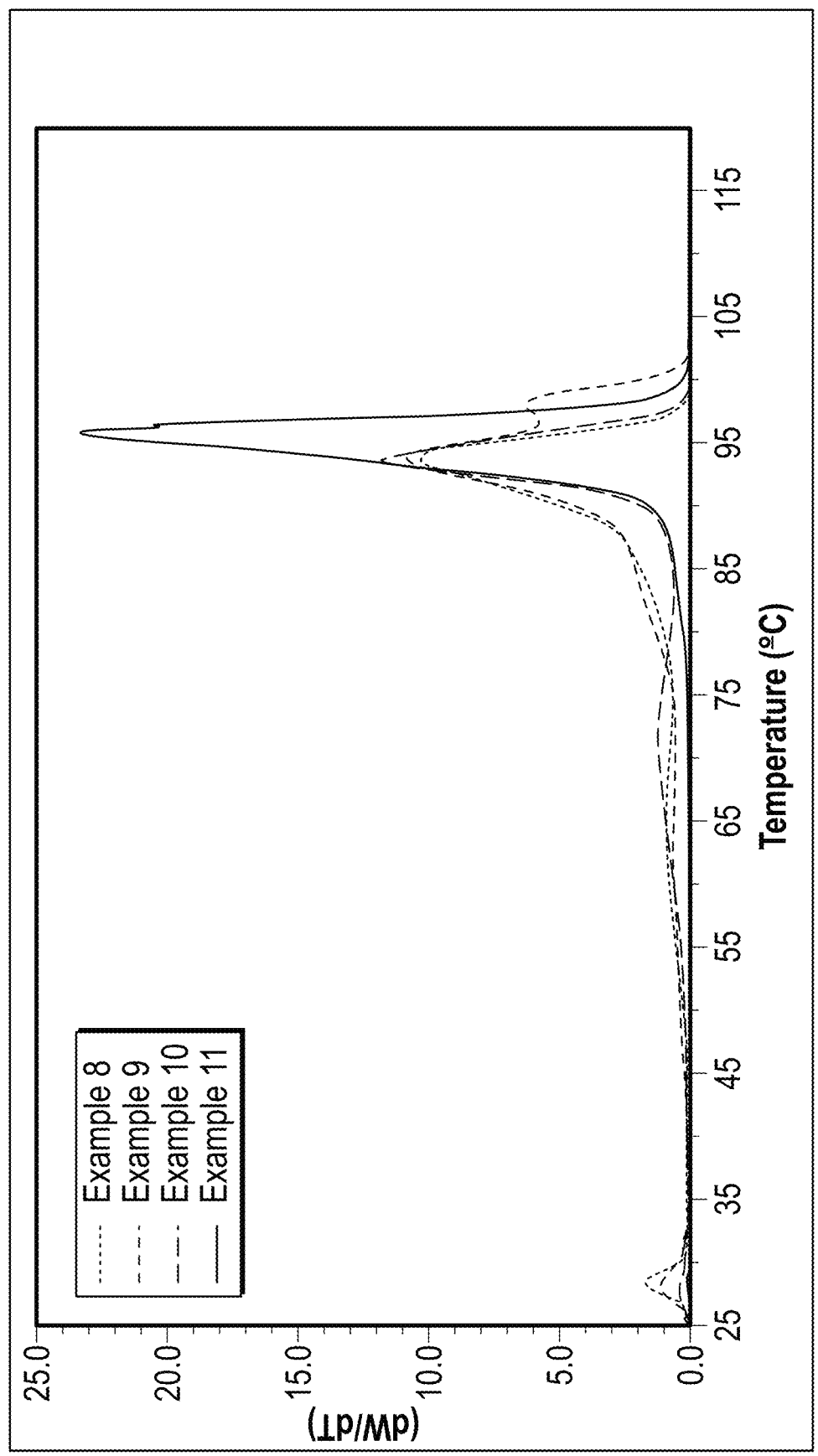
FIG. 6 presents a plot of the ATREF profiles of the polymers of Examples 8-11.

FIG. 6 illustrates the ATREF profiles of the polymers of Examples 8-11, and certain information from the ATREF profiles is summarized in Table IV. ATREF profiles of Examples 8-10 had single peaks at peak ATREF temperatures in the 90-95° C. range, with only 60-75 wt. % of the polymer eluting above 86° C., and much higher amounts of polymer eluted below 40° C. and in the 40-76° C. range, as compared to the metallocene-based polymer of Comparative Example 11.

Figure 7:
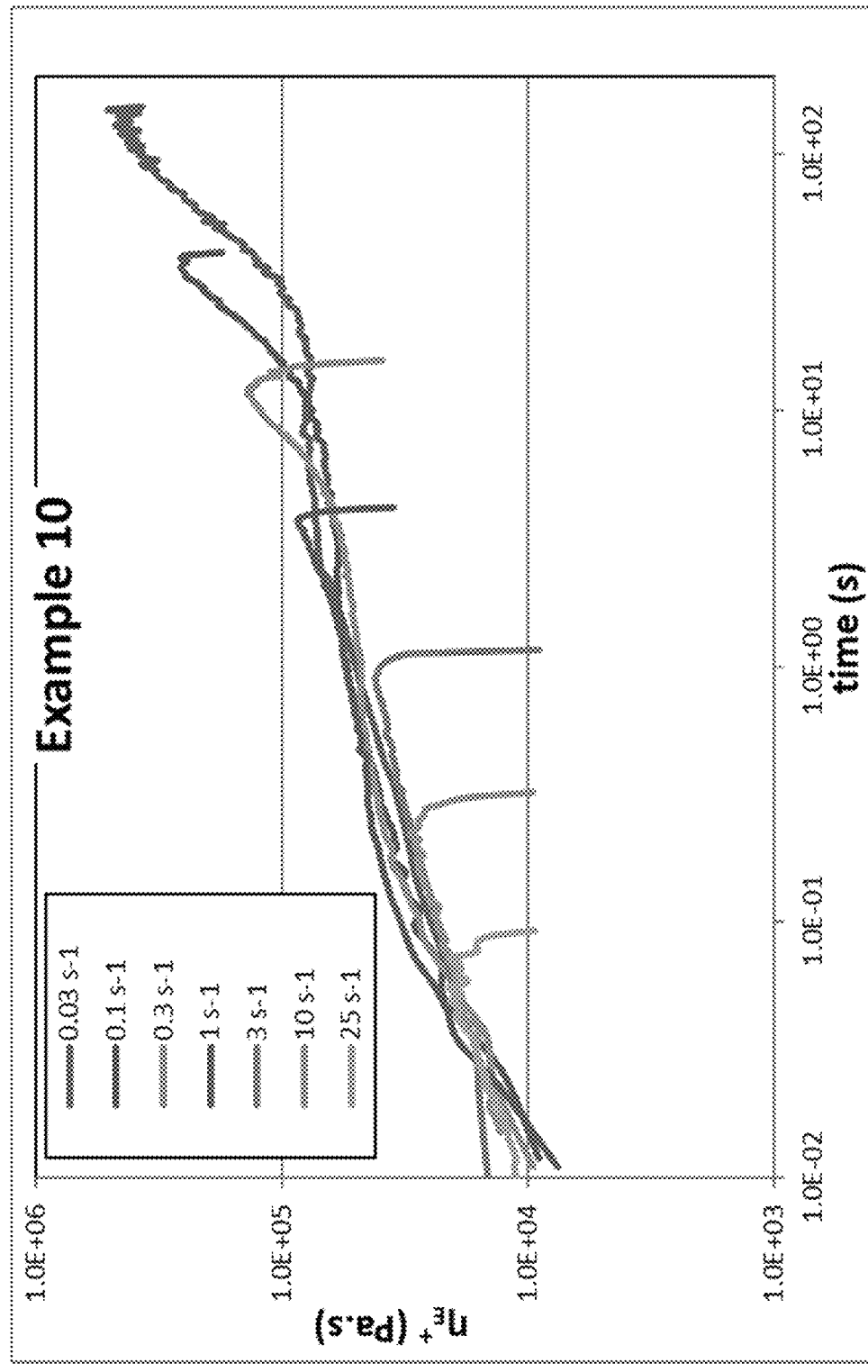
FIG. 7 presents an extensional viscosity plot (extensional viscosity versus shear rate) at 190° C. for the polymer of Example 10.
Figure 8:
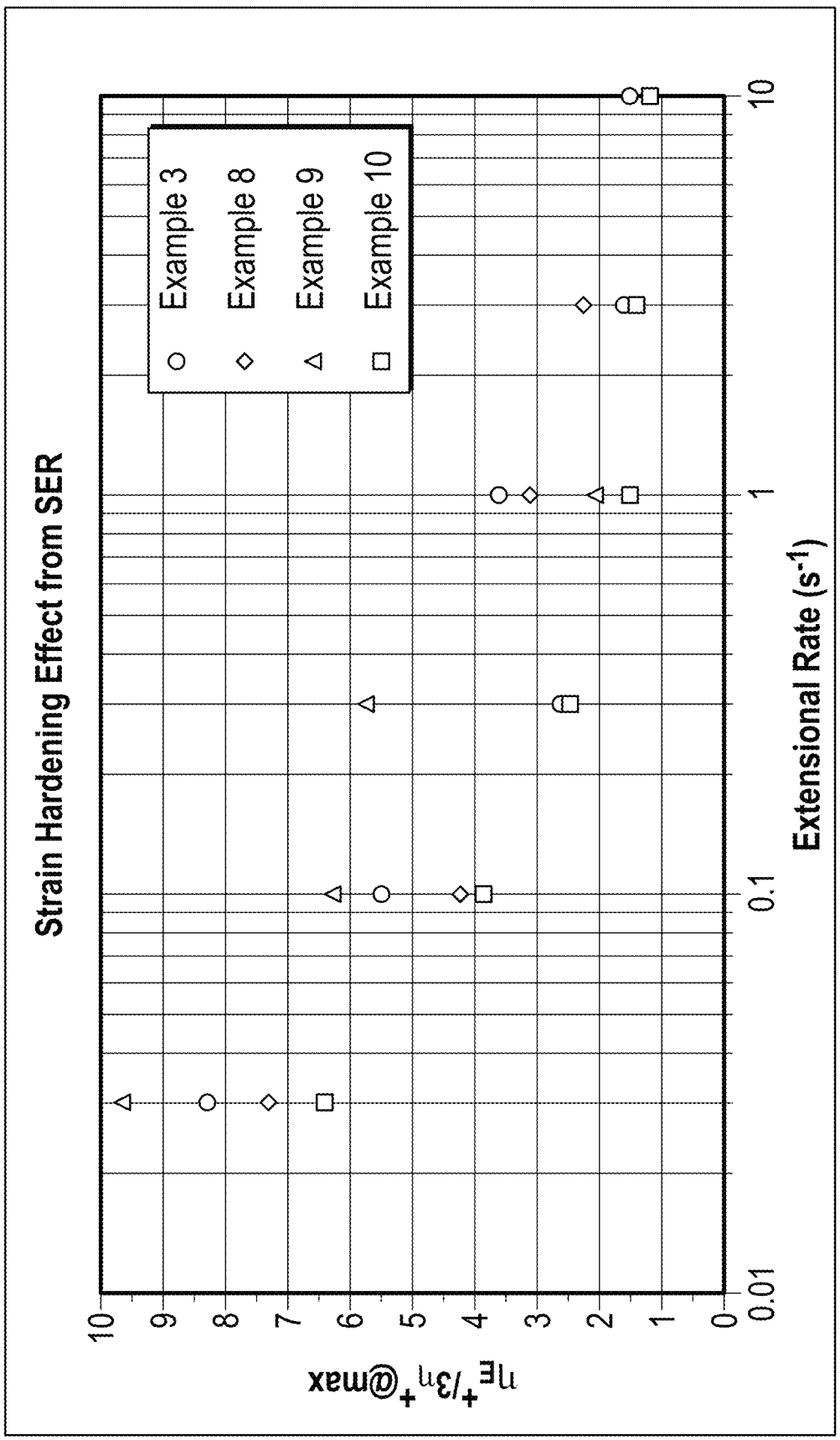
FIG. 8 presents a plot of the maximum ratio of $\eta_E/3\eta$ at extensional rates in the 0.03 to 10 sec$^{-1}$ range for the polymers of Examples 3 and 8-10.
Figure 9:
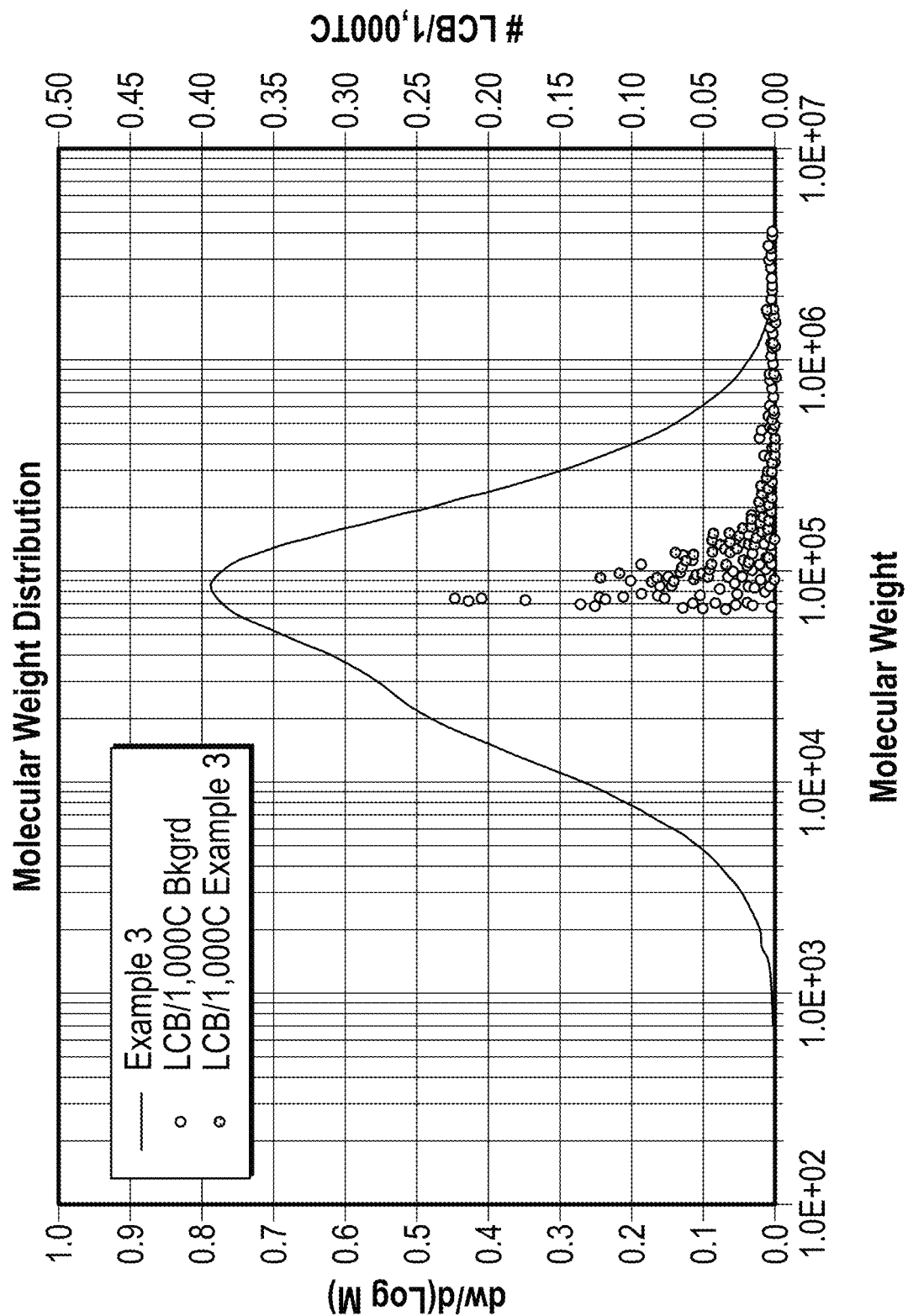
FIG. 9 presents a plot of the long chain branch distribution across the molecular weight distribution of the polymer of Example 3.

FIG. 7 illustrates an extensional viscosity plot at 190° C. for the polymer of Example 10, FIG. 8 summarizes the maximum ratio of $\eta_E/3\eta$ at extensional rates in the 0.03 to 10 sec$^{-1}$ range for the polymers of Examples 3 and 8-10, and FIG. 9 illustrates the long chain branch distribution across the molecular weight distribution of the polymer of Example 3, and these figures are representative of the other ethylene polymers produced in the inventive examples. The purpose of these figures was to ascertain the amount of LCBs and where it resides within the molecular weight distribution. As shown in Table II, the overall LCB contents (via the Janzen-Colby method) were in the 1-7 LCB range (per 1,000,000 carbon atoms). However, this method does not determine where the LCBs reside within the molecular weight distribution. Typically, the long chain branching is present in the high molecular weight fraction for single metallocene polymers, but unexpectedly, for the polymers of Example 1-10, this is not the case. There is substantially no long chain branching in the high molecular weight fraction—i.e., an average number of long chain branches (LCBs) per 1,000,000 total carbon atoms of the polymer in the molecular weight range of 500,000 to 2,000,000 g/mol is less than or equal to about 5.

FIG. 9 shows virtually no long chain branching in the high molecular weight fraction. The average number of LCBs per 1,000,000 total carbon atoms in the molecular weight range of 500,000 to 2,000,000 g/mol was 0.87 (i.e., less than 1 LCB per 1,000,000 total carbon atoms in the 500,000-2,000,000 g/mol range). This average LCB content was calculated from Equation 6 below.

$$\bar{\lambda} = \frac{\Sigma_{MW=2000\ kg/mol}^{MW=500\ kg/mol} \lambda_i \left(\frac{dw}{d(\text{Log }M)}\right)_i (d(\text{Log }M))_i}{\Sigma_{MW=2000\ kg/mol}^{MW=500\ kg/mol} \left(\frac{dw}{d(\text{Log}M)}\right)_i (d(\text{Log }M))_i} \quad \text{Equation 6}$$

where $\bar{\lambda}$ is the number-average LCB number in the molecular weight range of 500,000 to 2,000,000 g/mol and $\lambda_1$ is LCB at slice i.

It was desired that the presence of LCBs in lower molecular weight portions of the polymer could be quantified using this SEC-MALS technique. However, the numerous data points centered around a molecular weight of 100,000 g/mol in FIG. 9 have too much error for reliable quantification; the measured signal and the baseline/background are too similar at these lower molecular weights.

Extensional rheology, therefore, was used as a means to quantify the amount of LCBs in the lower molecular weight portion of the molecular weight distribution. For a Newtonian fluid, the ratio of extensional viscosity will be equal to 3 times the shear viscosity; the ratio of $\eta_E/3\eta$ will be equal to 1 for a Newtonian fluid. For molten polymers with strain hardening due to the presence of LCBs, the ratio of $\eta_E/3\eta$ will be greater than 1. FIG. 7 illustrates an extensional viscosity plot at 190° C. for the polymer of Example 10, determined using SER. The minor scatter in the baseline was due to the limited amount of samples for the SER experiments. From FIG. 7 and similar plots for Examples 3 and 8-9, FIG. 8 was prepared to summarize the maximum ratio of $\eta_E/3\eta$ at extensional rates in the 0.03 to 10 sec$^{-1}$ range for the polymers of Examples 3 and 8-10. A higher ratio equates to more strain hardening, and therefore, higher levels of LCBs. For these inventive polymers, unexpectedly, the maximum ratio of $\eta_E/3\eta$ at the extensional rate of 0.03 sec$^{-1}$ ranged from 6 to 10, and ranged from 3 to 7 at an extensional rate of 0.1 sec$^{-1}$.

Thus, despite there being substantially no long chain branching in the high molecular weight fraction of the inventive polymers, beneficially, there was a significant amount of long chain branching in the lower molecular weight fraction of the polymers, such that polymer melt strength and bubble stability in blown film and other applications is sufficient.

Table V summarizes tear resistance and optical properties of the films of Examples 8-10 and Comparative Example 11. Unexpectedly, the presence of LCBs only in the lower molecular weight fraction resulted in MD Elmendorf tear strengths that were much superior to that of standard metallocene-catalyzed Example 11. Also, the tear resistance improved with no sacrifice in optical properties; film haze was comparable for these examples.

Thus, the ethylene copolymers disclosed herein offer a beneficial combination of density, molecular weight, melt flow, LCB, SCB, and ATREF properties, resulting in improved processability and melt strength (or bubble stability). Film products produced from these copolymers have excellent optical properties and improved tear resistance, particularly in the machine direction, as quantified by the MD Elmendorf tear strength.

TABLE I

Examples 1-10 - Polymerization Experiments at 80° C.

| Example | MET-1 (mg) | MET-2 (mg) | FSCA (g) | Pressure (psig) | 1-Hexene (g) | Time (min) | Polymer (g) |
|---|---|---|---|---|---|---|---|
| One-gallon polymerization reactor ||||||||
| 1 | 0.05 | 1 | 0.09 | 320 | 40 | 30 | 75 |
| 2 | 0.1 | 1 | 0.11 | 320 | 40 | 30 | 101 |
| 3 | 0.15 | 1 | 0.10 | 320 | 40 | 30 | 88 |
| 4 | 0.2 | 1 | 0.10 | 320 | 40 | 30 | 76 |
| Five-gallon polymerization reactor ||||||||
| 5 | 1 | 6 | 0.25 | 350 | 100 | 30 | 1828 |
| 6 | 0.7 | 4.8 | 0.21 | 350 | 120 | 30 | 2275 |
| 7 | 0.5 | 3 | 0.12 | 350 | 150 | 60 | 2319 |
| 8 | 0.25 | 3 | 0.11 | 350 | 200 | 45 | 1435 |
| 9 | 0.25 | 3 | 0.16 | 350 | 220 | 30 | 2118 |
| 10 | 0.2 | 3 | 0.13 | 350 | 250 | 30 | 2006 |

TABLE II

Examples 1-12 - Polymer Properties.

| Example | MI (g/10 min) | HLMI (g/10 min) | Density (g/cc) | $\eta_0$ (Pa-sec) | $\tau_\eta$ (sec) | CY-a | LCBs per 1,000,000 carbon atoms |
|---|---|---|---|---|---|---|---|
| 1 | 0.01 | 0 | 0.926 | 53430 | 0.0928 | 0.343 | 2.6 |
| 2 | 0.09 | 7 | 0.928 | 28050 | 0.0465 | 0.336 | 2.5 |
| 3 | 0.41 | 31 | 0.929 | 7230 | 0.0140 | 0.348 | 2.5 |
| 4 | 3.80 | 114 | 0.929 | 1110 | 0.0040 | 0.422 | 2.9 |
| 5 | 2.11 | — | 0.941 | 3670 | 0.0078 | 0.514 | 1.9 |
| 6 | 3.40 | — | 0.940 | 2850 | 0.0072 | 0.515 | 1.4 |
| 7 | 9.17 | 245 | 0.941 | 1150 | 0.0026 | 0.452 | 2.9 |
| 8 | 2.31 | 73 | 0.932 | 5140 | 0.0097 | 0.415 | 6.5 |
| 9 | 2.56 | — | 0.936 | 3690 | 0.0085 | 0.424 | 3.8 |
| 10 | 1.11 | — | 0.930 | 9260 | 0.0188 | 0.427 | 2.0 |
| 11 | 0.9 | — | 0.933 | 7240 | 0.0112 | 0.523 | 1.0 |
| 12 | 0.2 | — | 0.955 | 607000 | 1.67 | 0.157 | 26.9 |

TABLE III

Examples 1-12 - Molecular Weight Properties.

| Example | Mn/1000 (g/mol) | Mw/1000 (g/mol) | Mz/1000 (g/mol) | Mp/1000 (g/mol) | IB | Mw/Mn | Mz/Mw |
|---|---|---|---|---|---|---|---|
| 1 | 37.2 | 184.3 | 519.8 | 129.3 | 1.21 | 4.96 | 2.82 |
| 2 | 32.4 | 161.7 | 447.3 | 116.8 | 1.21 | 5.00 | 2.77 |
| 3 | 22.8 | 118.7 | 354.6 | 91.8 | 1.34 | 5.21 | 2.99 |
| 4 | 13.6 | 73.4 | 266.4 | 19.0 | 1.62 | 5.40 | 3.63 |
| 5 | 26.7 | 103.0 | 247.9 | 95.0 | 1.24 | 3.86 | 2.41 |
| 6 | 24.0 | 98.6 | 247.7 | 92.7 | 1.31 | 4.11 | 2.51 |
| 7 | 19.1 | 74.1 | 213.9 | 52.1 | 1.38 | 3.88 | 2.89 |

TABLE III-continued

Examples 1-12 - Molecular Weight Properties.

| Example | Mn/1000 (g/mol) | Mw/1000 (g/mol) | Mz/1000 (g/mol) | Mp/1000 (g/mol) | IB | Mw/Mn | Mz/Mw |
|---|---|---|---|---|---|---|---|
| 8 | 19.1 | 95.5 | 296.7 | 93.8 | 1.49 | 5.00 | 3.11 |
| 9 | 18.6 | 96.3 | 277.6 | 79.7 | 1.35 | 5.18 | 2.88 |
| 10 | 24.9 | 129.5 | 366.9 | 99.9 | 1.22 | 5.19 | 2.83 |
| 11 | 55.7 | 129.0 | 232.6 | 103.1 | 0.94 | 2.32 | 1.80 |
| 12 | 18.0 | 133.9 | 833.8 | 45.1 | 1.55 | 7.44 | 6.23 |

TABLE IV

Examples 8-11 – ATREF Properties.

| Example | <40° C. (wt. %) | 40-76° C. (wt. %) | 76-86° C. (wt. %) | >86° C. (wt. %) | Peak Temp. (° C.) |
|---|---|---|---|---|---|
| 8 | 3.9 | 21.3 | 12.5 | 62.3 | 93.6 |
| 9 | 2.0 | 20.2 | 7.2 | 70.6 | 93.6 |
| 10 | 3.5 | 16.7 | 14.9 | 64.9 | 93.9 |
| 11 | 0.4 | 0.2 | 3.3 | 96.1 | 95.6 |

TABLE V

Examples 8-11 – Film Properties.

| Example | Tear MD (g/mil) | Tear TD (g/mil) | Tear Ratio MD/TD | Haze (%) |
|---|---|---|---|---|
| 8 | 100 | 261 | 0.38 | 8.8 |
| 9 | 51 | 123 | 0.41 | 8.3 |
| 10 | 132 | 511 | 0.26 | 7.0 |
| 11 | 36 | 549 | 0.07 | 6.8 |

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. An ethylene polymer having:
a melt index in a range from 0 to about 15 g/10 min;
a density in a range from about 0.91 to about 0.945 g/cm$^3$;
a CY-a parameter at 190° C. in a range from about 0.2 to about 0.6;
an average number of long chain branches (LCBs) per 1,000,000 total carbon atoms of the polymer in a molecular weight range of 500,000 to 2,000,000 g/mol of less than or equal to about 5; and
a maximum ratio of $\eta_E/3\eta$ at an extensional rate of 0.03 sec$^{-1}$ in a range from about 3 to about 15.

Aspect 2. The polymer defined in aspect 1, wherein the ethylene polymer has a melt index (MI) in any range disclosed herein, e.g., from 0 to about 15 g/10 min, from about 0.1 to about 10 g/10 min, from about 0.2 to about 5 g/10 min, from about 0.4 to about 4 g/10 min, from about 0.75 to about 2.75 g/10 min. etc.

Aspect 3. The polymer defined in aspect 1 or 2, wherein the ethylene polymer has a high load melt index (HLMI) in any range disclosed herein, e.g., from 0 to about 300 g/10 min, from about 5 to about 100 g/10 min, from about 25 to about 75 g/10 min, etc.

Aspect 4. The polymer defined in any one of the preceding aspects, wherein the ethylene polymer has a ratio of HLMI/MI in any range disclosed herein, e.g., from about 15 to about 90, from about 20 to about 80, from about 20 to about 40, etc.

Aspect 5. The polymer defined in any one of the preceding aspects, wherein the ethylene polymer has a density in any range disclosed herein, e.g., from about 0.91 to about 0.94 g/cm$^3$, from about 0.92 to about 0.945 g/cm$^3$, from about 0.92 to about 0.94 g/cm$^3$, from about 0.925 to about 0.945 g/cm$^3$, from about 0.922 to about 0.942 g/cm$^3$, etc.

Aspect 6. The polymer defined in any one of the preceding aspects, wherein the ethylene polymer has a CY-a parameter in any range disclosed herein, e.g., from about 0.25 to about 0.55, from about 0.3 to about 0.6, from about 0.3 to about 0.55, from about 0.32 to about 0.52, etc.

Aspect 7. The polymer defined in any one of the preceding aspects, wherein the ethylene polymer has a number of short chain branches (SCBs) per 1000 total carbon atoms of the polymer at Mn that is greater than at Mz, and/or a number of short chain branches (SCBs) per 1000 total carbon atoms of the polymer at Mn that is greater than at Mw, and/or a number of short chain branches (SCBs) per 1000 total carbon atoms of the polymer at Mw that is greater than at Mz (a conventional short chain branching distribution or decreasing comonomer distribution).

Aspect 8. The polymer defined in any one of the preceding aspects, wherein the ethylene polymer has an average number of long chain branches (LCBs) per 1,000,000 total carbon atoms of the polymer in the molecular weight range of 500,000 to 2,000,000 g/mol in any range disclosed herein, e.g., less than or equal to about 4, less than or equal to about 3, less than or equal to about 2, less than or equal to about 1, etc.

Aspect 9. The polymer defined in any one of the preceding aspects, wherein the ethylene polymer has a maximum ratio of $\eta_E/3\eta$ at an extensional rate of 0.03 sec$^{-1}$ in any range disclosed herein, e.g., from about 3 to about 10, from about 4 to about 15, from about 4 to about 12, from about 4 to about 10, from about 5 to about 9, etc.

Aspect 10. The polymer defined in any one of the preceding aspects, wherein the ethylene polymer has a maximum ratio of $\eta_E/3\eta$ at an extensional rate of 0.1 sec$^{-1}$ in any range disclosed herein, e.g., from about 2 to about 10, from about 2 to about 8, from about 2 to about 6, from about 3 to about 9, from about 3 to about 7, etc.

Aspect 11. The polymer defined in any one of the preceding aspects, wherein the ethylene polymer contains from about 1 to about 10 LCBs, from about 1 to about 8 LCBs, from about 1 to about 7 LCBs, etc., per 1,000,000 total carbon atoms.

Aspect 12. The polymer defined in any one of the preceding aspects, wherein the ethylene polymer has a ratio of Mw/Mn in any range disclosed herein, e.g., from about 3 to about 10, from about 3.5 to about 8, from about 3 to about 6, from about 3.5 to about 6, etc.

Aspect 13. The polymer defined in any one of the preceding aspects, wherein the ethylene polymer has a ratio of Mz/Mw in any range disclosed herein, e.g., from about 2 to about 5, from about 2 to about 4.5, from about 2.2 to about 5, from about 2.2 to about 4, etc.

Aspect 14. The polymer defined in any one of the preceding aspects, wherein the ethylene polymer has a Mz in any range disclosed herein, e.g., from about 150,000 to about 600,000 g/mol, from about 200,000 to about 550,000 g/mol, from about 200,000 to about 500,000 g/mol, from about 220,000 to about 450,000 g/mol, etc.

Aspect 15. The polymer defined in any one of the preceding aspects, wherein the ethylene polymer has a Mw in any range disclosed herein, e.g., from about 50,000 to about 250,000 g/mol, from about 60,000 to about 200,000 g/mol, from about 70,000 to about 185,000 g/mol, from about 65,000 to about 175,000 g/mol, from about 80,000 to about 140,000 g/mol, etc.

Aspect 16. The polymer defined in any one of the preceding aspects, wherein the ethylene polymer has a Mn in any range disclosed herein, e.g., from about 10,000 to about 50,000 g/mol, from about 10,000 to about 40,000 g/mol, from about 10,000 to about 38,000 g/mol, from about 12,000 to about 30,000 g/mol, etc.

Aspect 17. The polymer defined in any one of the preceding aspects, wherein the ethylene polymer has an IB parameter in any range disclosed herein, e.g., from about 1 to about 2, from about 1 to about 1.7, from about 1.1 to about 1.8, from about 1.15 to about 1.75, etc.

Aspect 18. The polymer defined in any one of the preceding aspects, wherein the ethylene polymer has a zero-shear viscosity in any range disclosed herein, e.g., from about 1000 to about 1,000,000 Pa-sec, from about 1000 to about 50,000 Pa-sec, from about 2000 to about 10,000 Pa-sec, etc.

Aspect 19. The polymer defined in any one of the preceding aspects, wherein the ethylene polymer has a relaxation time in any range disclosed herein, e.g., from about 0.001 to about 0.15 sec, from about 0.002 to about 0.1 sec, from about 0.002 to about 0.025 sec, etc.

Aspect 20. The polymer defined in any one of the preceding aspects, wherein the ethylene polymer has an ATREF profile characterized by a peak ATREF temperature in any range disclosed herein, e.g., from about 85 to about 100° C., from about 88 to about 98° C., from about 90 to about 96° C., etc.

Aspect 21. The polymer defined in any one of the preceding aspects, wherein the ethylene polymer has an ATREF profile characterized by from about 0.5 to about 6 wt. % (or from about 1 to about 5 wt. %, or from about 1.5 to about 4.5 wt. %) of the polymer eluting below a temperature of 40° C., by from about 12 to about 26 wt. % (or from about 13 to about 24 wt. %, or from about 14 to about 23 wt. %) of the polymer eluting between 40 and 76° C., by from about 52 to about 82 wt. % (or from about 55 to about 80 wt. %, or from about 58 to about 75 wt. %) of the polymer eluting above a temperature of 86° C., and the remainder of the polymer (to reach 100 wt. %) eluting between 76 and 86° C.

Aspect 22. The polymer defined in any one of the preceding aspects, wherein the ethylene polymer is a single reactor product, e.g., not a post-reactor blend of two polymers, for instance, having different molecular weight characteristics.

Aspect 23. The polymer defined in any one of the preceding aspects, wherein the ethylene polymer comprises an ethylene/α-olefin copolymer and/or an ethylene homopolymer.

Aspect 24. The polymer defined in any one of the preceding aspects, wherein the ethylene polymer comprises an ethylene/1-butene copolymer, an ethylene/1-hexene copolymer, an ethylene/1-octene copolymer, an ethylene homopolymer, or any combination thereof.

Aspect 25. The polymer defined in any one of the preceding aspects, wherein the ethylene polymer comprises an ethylene/1-hexene copolymer.

Aspect 26. The polymer defined in any one of the preceding aspects, wherein the ethylene polymer contains, independently, less than 0.1 ppm (by weight), less than 0.08 ppm, less than 0.05 ppm, less than 0.03 ppm, etc., of chromium and titanium.

Aspect 27. The polymer defined in any one of the preceding aspects, wherein the polymer further comprises any additive disclosed herein, e.g., an antioxidant, an acid scavenger, an antiblock additive, a slip additive, a colorant, a filler, a polymer processing aid, a UV additive, etc., or combinations thereof.

Aspect 28. An article of manufacture comprising (or produced from) the ethylene polymer defined in any one of aspects 1-27.

Aspect 29. An article of manufacture comprising (or produced from) the ethylene polymer defined in any one of aspects 1-27, wherein the article is an agricultural film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product, outdoor play equipment, a pipe, a sheet or tape, a toy, or a traffic barrier.

Aspect 30. A film comprising (or produced from) the ethylene polymer defined in any one of aspects 1-27.

Aspect 31. The film defined in aspect 30, wherein the film has a haze (with or without additives) in any range disclosed herein, e.g., less than or equal to about 10%, less than or equal to about 9%, from about 3 to about 10%, from about 4 to about 9%, from about 5 to about 10%, etc.

Aspect 32. The film defined in aspect 30 or 31, wherein the film has a MD Elmendorf tear strength in any range disclosed herein, e.g., from about 40 to about 250 g/mil, from about 45 to about 200 g/mil, from about 40 to about 150 g/mil, from about 50 to about 150 g/mil, etc.

Aspect 33. The film defined in any one of aspects 30-32, wherein the film has a TD Elmendorf tear strength in any range disclosed herein, e.g., from about 75 to about 600 g/mil, from about 100 to about 550 g/mil, from about 120 to about 550 g/mil, etc.

Aspect 34. The film defined in any one of aspects 30-33, wherein the film has an average thickness in any range disclosed herein, e.g., from about 0.5 to about 20 mils, from about 0.5 to about 8 mils, from about 0.8 to about 5 mils, from about 0.7 to about 2 mils, etc.

Aspect 35. The film defined in any one of aspects 30-34, wherein the film has a ratio of MD Elmendorf tear strength to TD Elmendorf tear strength (MD:TD) in any range disclosed herein, e.g., from about 0.15:1 to about 0.55:1, from about 0.2:1 to about 0.5:1, from about 0.2:1 to about 0.45:1, from about 0.25:1 to about 0.5:1, etc.

Aspect 36. A catalyst composition comprising:
catalyst component I comprising any single atom bridged metallocene compound disclosed herein with an indenyl group and a cyclopentadienyl group;
catalyst component II comprising any unbridged hafnium metallocene compound disclosed herein with two cyclopentadienyl groups;
any activator disclosed herein; and
optionally, any co-catalyst disclosed herein.

Aspect 37. The composition defined in aspect 36, wherein the activator comprises an activator-support, an aluminoxane compound, an organoboron or organoborate compound, an ionizing ionic compound, or any combination thereof.

Aspect 38. The composition defined in aspect 36, wherein the activator comprises an aluminoxane compound.

Aspect 39. The composition defined in aspect 36, wherein the activator comprises an organoboron or organoborate compound.

Aspect 40. The composition defined in aspect 36, wherein the activator comprises an ionizing ionic compound.

Aspect 41. The composition defined in aspect 36, wherein the activator comprises an activator-support, the activator-support comprising any solid oxide treated with any electron-withdrawing anion disclosed herein.

Aspect 42. The composition defined in aspect 36, wherein the activator comprises fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, fluorided-chlorided silica-coated alumina, sulfated silica-coated alumina, phosphated silica-coated alumina, or any combination thereof.

Aspect 43. The composition defined in aspect 36, wherein the activator comprises fluorided alumina, sulfated alumina, fluorided silica-alumina, sulfated silica-alumina, fluorided silica-coated alumina, fluorided-chlorided silica-coated alumina, sulfated silica-coated alumina, or any combination thereof.

Aspect 44. The composition defined in aspect 36, wherein the activator comprises a fluorided solid oxide and/or a sulfated solid oxide.

Aspect 45. The composition defined in any one of aspects 41-44, wherein the activator further comprises any metal or metal ion disclosed herein, e.g., zinc, nickel, vanadium, titanium, silver, copper, gallium, tin, tungsten, molybdenum, zirconium, or any combination thereof.

Aspect 46. The composition defined in any one of aspects 36-45, wherein the catalyst composition comprises a co-catalyst, e.g., any suitable co-catalyst.

Aspect 47. The composition defined in any one of aspects 36-46, wherein the co-catalyst comprises any organoaluminum compound disclosed herein.

Aspect 48. The composition defined in aspect 47, wherein the organoaluminum compound comprises trimethylaluminum, triethylaluminum, triisobutylaluminum, or a combination thereof.

Aspect 49. The composition defined in any one of aspects 41-48, wherein the catalyst composition comprises catalyst component I, catalyst component II, a solid oxide treated with an electron-withdrawing anion, and an organoaluminum compound.

Aspect 50. The composition defined in any one of aspects 36-49, wherein at least one of the indenyl group and the cyclopentadienyl group is substituted.

Aspect 51. The composition defined in any one of aspects 36-50, wherein catalyst component I has an unsubstituted cyclopentadienyl group and an alkyl-substituted indenyl group, e.g., a $C_1$ to $C_6$ alkyl group.

Aspect 52. The composition defined in any one of aspects 36-51, wherein catalyst component I has a single carbon or silicon bridging atom.

Aspect 53. The composition defined in aspect 52, wherein the carbon or silicon bridging atom has two substituents independently selected from H or a $C_1$ to $C_{18}$ hydrocarbyl group, e.g., a $C_1$ to $C_6$ alkyl group.

Aspect 54. The composition defined in any one of aspects 36-53, wherein catalyst component I contains zirconium.

Aspect 55. The composition defined in any one of aspects 36-54, wherein at least one of the two cyclopentadienyl groups is substituted.

Aspect 56. The composition defined in any one of aspects 36-55, wherein the cyclopentadienyl groups are substituted.

Aspect 57. The composition defined in any one of aspects 36-56, wherein the substituents are the same (or different).

Aspect 58. The composition defined in any one of aspects 36-57, wherein the two cyclopentadienyl groups are the same or different, and are alkyl-substituted cyclopentadienyl groups, e.g., a $C_1$ to $C_6$ alkyl group.

Aspect 59. The composition defined in any one of aspects 41-58, wherein the catalyst composition is substantially free of aluminoxane compounds, organoboron or organoborate compounds, ionizing ionic compounds, or combinations thereof.

Aspect 60. The composition defined in any one of aspects 36-59, wherein a weight ratio of catalyst component I to catalyst component II in the catalyst composition is in any range disclosed herein, e.g., from about 25:1 to about 1:25, from about 10:1 to about 1:10, from about 5:1 to about 1:5, from about 1:1 to about 1:20, from about 1:2 to about 1:10, etc.

Aspect 61. The composition defined in any one of aspects 36-60, wherein the catalyst composition is produced by a process comprising contacting, in any order, catalyst component I, catalyst component II, and the activator.

Aspect 62. The composition defined in any one of aspects 36-61, wherein the catalyst composition is produced by a process comprising contacting, in any order, catalyst component I, catalyst component II, the activator, and the co-catalyst.

Aspect 63. The composition defined in any one of aspects 36-62, wherein a catalyst activity of the catalyst composition is in any range disclosed herein, e.g., from about 500 to about 5000, from about 750 to about 4000, from about 1000 to about 3500 grams, etc., of ethylene polymer per gram of activator-support per hour, under slurry polymerization conditions, with a triisobutylaluminum co-catalyst, using isobutane as a diluent, and with a polymerization temperature of 80° C. and a reactor pressure of 350 psig.

Aspect 64. An olefin polymerization process, the process comprising contacting the catalyst composition defined in any one of aspects 36-63 with an olefin monomer and an optional olefin comonomer in a polymerization reactor system under polymerization conditions to produce an olefin polymer.

Aspect 65. The process defined in aspect 64, wherein the olefin monomer comprises any olefin monomer disclosed herein, e.g., any $C_2$-$C_{20}$ olefin.

Aspect 66. The process defined in aspect 64 or 65, wherein the olefin monomer and the olefin comonomer independently comprise a $C_2$-$C_{20}$ alpha-olefin.

Aspect 67. The process defined in any one of aspects 64-66, wherein the olefin monomer comprises ethylene.

Aspect 68. The process defined in any one of aspects 64-67, wherein the catalyst composition is contacted with ethylene and an olefin comonomer comprising a $C_3$-$C_{10}$ alpha-olefin.

Aspect 69. The process defined in any one of aspects 64-68, wherein the catalyst composition is contacted with ethylene and an olefin comonomer comprising 1-butene, 1-hexene, 1-octene, or a mixture thereof.

Aspect 70. The process defined in any one of aspects 64-66, wherein the olefin monomer comprises propylene.

Aspect 71. The process defined in any one of aspects 64-70, wherein the polymerization reactor system comprises a batch reactor, a slurry reactor, a gas-phase reactor, a solution reactor, a high pressure reactor, a tubular reactor, an autoclave reactor, or a combination thereof.

Aspect 72. The process defined in any one of aspects 64-71, wherein the polymerization reactor system comprises a slurry reactor, a gas-phase reactor, a solution reactor, or a combination thereof.

Aspect 73. The process defined in any one of aspects 64-72, wherein the polymerization reactor system comprises a loop slurry reactor.

Aspect 74. The process defined in any one of aspects 64-73, wherein the polymerization reactor system comprises a single reactor.

Aspect 75. The process defined in any one of aspects 64-73, wherein the polymerization reactor system comprises 2 reactors.

Aspect 76. The process defined in any one of aspects 64-73, wherein the polymerization reactor system comprises more than 2 reactors.

Aspect 77. The process defined in any one of aspects 64-76, wherein the olefin polymer comprises any olefin polymer disclosed herein.

Aspect 78. The process defined in any one of aspects 64-69 and 71-77, wherein the olefin polymer comprises an ethylene homopolymer, an ethylene/1-butene copolymer, an ethylene/1-hexene copolymer, and/or an ethylene/1-octene copolymer.

Aspect 79. The process defined in any one of aspects 64-69 and 71-78, wherein the olefin polymer comprises an ethylene/1-hexene copolymer.

Aspect 80. The process defined in any one of aspects 64-66 and 70-77, wherein the olefin polymer comprises a polypropylene homopolymer or a propylene-based copolymer.

Aspect 81. The process defined in any one of aspects 64-80, wherein the polymerization conditions comprise a polymerization reaction temperature in a range from about 60° C. to about 120° C. and a reaction pressure in a range from about 200 to about 1000 psig (about 1.4 to about 6.9 MPa).

Aspect 82. The process defined in any one of aspects 64-81, wherein the polymerization conditions are substantially constant, e.g., for a particular polymer grade.

Aspect 83. The process defined in any one of aspects 64-82, wherein no hydrogen is added to the polymerization reactor system.

Aspect 84. The process defined in any one of aspects 64-82, wherein hydrogen is added to the polymerization reactor system.

Aspect 85. The process defined in any one of aspects 64-84, wherein the olefin polymer produced is defined in any one of aspects 1-27.

Aspect 86. An olefin polymer produced by the olefin polymerization process defined in any one of aspects 64-84.

Aspect 87. An ethylene polymer defined in any one of aspects 1-27 produced by the process defined in any one of aspects 64-84.

Aspect 88. An article comprising the polymer defined in any one of aspects 85-87.

Aspect 89. A method or forming or preparing an article of manufacture comprising an olefin polymer, the method comprising (i) performing the olefin polymerization process defined in any one of aspects 64-84 to produce an olefin polymer (e.g., the ethylene polymer of any one of aspects 1-27), and (ii) forming the article of manufacture comprising the olefin polymer, e.g., via any technique disclosed herein.

We claim:

1. A film comprising an ethylene polymer, the ethylene polymer having:
   a melt index in a range from 0 to about 15 g/10 min;
   a density in a range from about 0.91 to about 0.945 g/cm$^3$;
   a CY-a parameter at 190° C. in a range from about 0.2 to about 0.6;
   an average number of long chain branches (LCBs) per 1,000,000 total carbon atoms of the ethylene polymer in a molecular weight range of 500,000 to 2,000,000 g/mol of less than or equal to about 5; and
   a maximum ratio of extensional viscosity to three times shear viscosity, $\eta_E/3\eta$, at an extensional rate of 0.03 sec$^{-1}$ in a range from about 3 to about 15.

2. The film of claim 1, wherein the film has an average thickness in a range from about 0.5 to about 8 mils.

3. The film of claim 1, wherein the film has a MD Elmendorf tear strength in a range from about 40 to about 250 g/mil.

4. The film of claim 1, wherein the film has a ratio of MD Elmendorf tear strength to TD Elmendorf tear strength (MD:TD) in a range from about 0.15:1 to about 0.55:1.

5. The film of claim 1, wherein the film has a haze in a range from about 3 to about 10%.

6. The film of claim 1, wherein:
   the ethylene polymer comprises an ethylene/1-butene copolymer, an ethylene/1-hexene copolymer, an ethylene/1-octene copolymer, or a combination thereof; and
   the film has:
      a MD Elmendorf tear strength in a range from about 40 to about 250 g/mil;
      a ratio of MD Elmendorf tear strength to TD Elmendorf tear strength (MD:TD) in a range from about 0.15:1 to about 0.55:1; and
      a haze in a range from about 3 to about 10%.

7. The film of claim 6, wherein:
   the melt index is in a range from about 0.4 to about 4 g/10 min;
   the density is in a range from about 0.91 to about 0.94 g/cm$^3$; and
   the CY-a parameter at 190° C. is in a range from about 0.3 to about 0.6.

8. A film comprising an ethylene polymer, wherein:
   the ethylene polymer has:
      a melt index in a range from 0 to about 15 g/10 min;
      a density in a range from about 0.91 to about 0.945 g/cm$^3$;
      a CY-a parameter at 190° C. in a range from about 0.2 to about 0.6; and
      a number of short chain branches (SCBs) per 1000 total carbon atoms of the ethylene polymer at Mn that is greater than at Mz; and
   the film has:
      a MD Elmendorf tear strength in a range from about 40 to about 250 g/mil; and
      a ratio of MD Elmendorf tear strength to TD Elmendorf tear strength (MD:TD) in a range from about 0.15:1 to about 0.55:1.

9. The film of claim 8, wherein the ethylene polymer comprises an ethylene/1-butene copolymer, an ethylene/1-hexene copolymer, an ethylene/1-octene copolymer, or a combination thereof.

10. The film of claim 9, wherein the film has an average thickness in a range from about 0.5 to about 8 mils.

11. The film of claim 8, wherein the film further comprises an additive selected from an antioxidant, an acid scavenger, an antiblock additive, a slip additive, a colorant, a filler, a polymer processing aid, a UV additive, or any combination thereof.

12. The film of claim 8, wherein:
   an average number of long chain branches (LCBs) per 1,000,000 total carbon atoms of the ethylene polymer in a molecular weight range of 500,000 to 2,000,000 g/mol of less than or equal to about 5; and a maximum ratio of extensional viscosity to three times shear viscosity, $\eta_E/3\eta$, at an extensional rate of 0.03 sec$^{-1}$ in a range from about 3 to about 15.

13. The film of claim 12, wherein:
the melt index is in a range from about 0.1 to about 10 g/10 min;
the density is in a range from about 0.91 to about 0.94 g/cm$^3$;
the CY-a parameter at 190° C. is in a range from about 0.3 to about 0.55;
the average number of LCBs per 1,000,000 total carbon atoms of the ethylene polymer in a molecular weight range of 500,000 to 2,000,000 g/mol is less than or equal to about 3; and
the maximum ratio of $\eta_E/3\eta$ at an extensional rate of 0.03 sec$^{-1}$ is in a range from about 4 to about 12.

14. The film of claim 13, wherein the ethylene polymer has a ratio of HLMI/MI in a range from about 20 to about 80.

15. A film comprising an ethylene polymer, wherein:
the ethylene polymer has:
a melt index in a range from 0 to about 15 g/10 min;
a density in a range from about 0.91 to about 0.945 g/cm$^3$;
a CY-a parameter at 190° C. in a range from about 0.2 to about 0.6;
an integral breadth IB parameter in a range from about 1.1 to about 1.8; and
a relaxation time in a range from about 0.002 to about 0.025 sec; and
the film has:
a MD Elmendorf tear strength in a range from about 40 to about 250 g/mil; and
a haze in a range from about 3 to about 10%.

16. The film of claim 15, wherein the ethylene polymer comprises an ethylene/1-butene copolymer, an ethylene/1-hexene copolymer, an ethylene/1-octene copolymer, or a combination thereof.

17. The film of claim 16, wherein:
an average number of long chain branches (LCBs) per 1,000,000 total carbon atoms of the ethylene polymer in a molecular weight range of 500,000 to 2,000,000 g/mol of less than or equal to about 5; and
a maximum ratio of extensional viscosity to three times shear viscosity, $\eta_E/3\eta$, at an extensional rate of 0.03 sec$^{-1}$ in a range from about 3 to about 15.

18. The film of claim 15, wherein:
the melt index is in a range from about 0.4 to about 4 g/10 min;
the density is in a range from about 0.91 to about 0.94 g/cm$^3$; and
the CY-a parameter at 190° C. is in a range from about 0.3 to about 0.6.

19. The film of claim 18, wherein the ethylene polymer contains less than 0.1 ppm, independently, of chromium and titanium.

20. The film of claim 18, wherein the ethylene polymer contains from about 1 to about 10 LCBs per 1,000,000 total carbon atoms.

21. A film comprising an ethylene polymer, wherein:
the ethylene polymer has:
a melt index in a range from 0 to about 15 g/10 min;
a density in a range from about 0.91 to about 0.945 g/cm$^3$;
a CY-a parameter at 190° C. in a range from about 0.2 to about 0.6;
a relaxation time in a range from about 0.002 to about 0.025 sec; and
an ATREF profile characterized by a peak ATREF temperature in a range from about 88 to about 98° C.; and
the film has:
a MD Elmendorf tear strength in a range from about 40 to about 250 g/mil; and
a ratio of MD Elmendorf tear strength to TD Elmendorf tear strength (MD:TD) in a range from about 0.15:1 to about 0.55:1.

22. The film of claim 21, wherein the ethylene polymer comprises an ethylene/1-butene copolymer, an ethylene/1-hexene copolymer, an ethylene/1-octene copolymer, or a combination thereof.

23. The film of claim 22, wherein the ATREF profile is further characterized by:
from about 0.5 to about 6 wt % of the ethylene polymer eluting below a temperature of 40° C.;
from about 12 to about 26 wt % of the ethylene polymer eluting between 40 and 76° C.;
from about 52 to about 82 wt % of the ethylene polymer eluting above a temperature of 86° C.; and
a remainder of the ethylene polymer eluting between 76 and 86° C.

24. A film comprising an ethylene polymer, wherein:
the ethylene polymer has:
a melt index in a range from 0 to about 15 g/10 min;
a density in a range from about 0.91 to about 0.945 g/cm$^3$;
a CY-a parameter at 190° C. in a range from about 0.2 to about 0.6;
an ATREF profile characterized by:
a peak ATREF temperature in a range from about 88 to about 98° C.;
from about 0.5 to about 6 wt % of the ethylene polymer eluting below a temperature of 40° C.;
from about 12 to about 26 wt % of the ethylene polymer eluting between 40 and 76° C.;
from about 52 to about 82 wt % of the ethylene polymer eluting above a temperature of 86° C.; and
a remainder of the ethylene polymer eluting between 76 and 86° C.; and
the film has:
a MD Elmendorf tear strength in a range from about 40 to about 250 g/mil; and
a haze in a range from about 3 to about 10%.

25. The film of claim 24, wherein the ethylene polymer has a Mw in a range from about 50,000 to about 250,000 g/mol.

* * * * *